(12) United States Patent
Arsenault et al.

(10) Patent No.: US 8,897,427 B2
(45) Date of Patent: Nov. 25, 2014

(54) METHOD AND APPARATUS FOR ENABLING A CALLING PARTY TO LEAVE A VOICE MESSAGE FOR A CALLED PARTY

(75) Inventors: Jonathan Allan Arsenault, Orleans (CA); Nathan Gerald Archer, Russell (CA); Yannick Lessard, Ottawa (CA); Pierre Fortin, Quebec (CA)

(73) Assignee: BCE Inc., Montreal (CA)

( * ) Notice: Subject to any disclaimer, the term of this patent is extended or adjusted under 35 U.S.C. 154(b) by 1024 days.

(21) Appl. No.: 12/743,325

(22) PCT Filed: Dec. 21, 2007

(86) PCT No.: PCT/CA2007/002323
§ 371 (c)(1),
(2), (4) Date: May 17, 2010

(87) PCT Pub. No.: WO2009/065207
PCT Pub. Date: May 28, 2009

(65) Prior Publication Data
US 2010/0272247 A1    Oct. 28, 2010

Related U.S. Application Data

(60) Provisional application No. 60/989,676, filed on Nov. 21, 2007.

(51) Int. Cl.
*H04M 1/64* (2006.01)
*H04M 3/436* (2006.01)
*H04M 1/65* (2006.01)
*H04M 3/533* (2006.01)

(52) U.S. Cl.
CPC ............ *H04M 3/436* (2013.01); *H04M 1/6505* (2013.01); *H04M 2203/651* (2013.01); *H04M 2203/2011* (2013.01); *H04M 3/53391* (2013.01)
USPC .................. 379/88.22; 379/88.16; 379/88.18; 455/413

(58) Field of Classification Search
USPC .......... 379/88.13, 88.14, 88.22, 88.16, 88.18, 379/88.25; 455/413
See application file for complete search history.

(56) References Cited

U.S. PATENT DOCUMENTS 5,220,599 A    6/1993   Sasano et al.
5,276,731 A    1/1994   Arbel et al.
(Continued)

FOREIGN PATENT DOCUMENTS

CA    2533514    2/2005
EP    0569164    10/1993
(Continued)

OTHER PUBLICATIONS

Office Action issued on Aug. 31, 2012 in connection with U.S. Appl. No. 12/809,711, 30 pages.
(Continued)

*Primary Examiner* — Md S Elahee
(74) *Attorney, Agent, or Firm* — Gowling Lafleur Henderson LLP

(57) ABSTRACT

A method for execution by a network entity to allow a calling party to leave a message for a called party, the calling party using a communication device to call the called party, the network entity being connected to the communication device via a communications network. The method may comprise: consulting at least one source of information in an attempt to obtain message destination information associated with the called party; if the attempt is successful, providing an opportunity for the calling party to leave a message for the called party; receiving a voice message provided by the calling party via the communication device; generating an electronic message representative of the voice message provided by the calling party; and causing transmission of the electronic message based on the message destination information. An apparatus for implementing the method is also provided.

35 Claims, 6 Drawing Sheets

(56) References Cited

U.S. PATENT DOCUMENTS

| | | | |
|---|---|---|---|
| 5,299,260 | A | 3/1994 | Shaio |
| 5,329,578 | A | 7/1994 | Brennan et al. |
| 5,392,342 | A | 2/1995 | Rosenthal |
| 5,430,791 | A | 7/1995 | Feit et al. |
| 5,465,295 | A | 11/1995 | Furman |
| 5,479,496 | A | 12/1995 | Endo et al. |
| 5,506,890 | A | 4/1996 | Gupta et al. |
| 5,533,107 | A | 7/1996 | Irwin et al. |
| 5,764,746 | A | 6/1998 | Reichelt |
| 5,793,859 | A | 8/1998 | Matthews |
| 5,875,240 | A | 2/1999 | Silverman |
| 5,987,100 | A | 11/1999 | Fortman et al. |
| 5,999,613 | A | 12/1999 | Nabkel et al. |
| 6,005,870 | A | 12/1999 | Leung et al. |
| 6,067,349 | A | 5/2000 | Suder et al. |
| 6,134,310 | A | 10/2000 | Swan et al. |
| 6,246,871 | B1 * | 6/2001 | Ala-Laurila .................. 455/413 |
| 6,295,353 | B1 | 9/2001 | Flockhart et al. |
| 6,304,573 | B1 | 10/2001 | Hicks, III |
| 6,389,117 | B1 | 5/2002 | Gross et al. |
| 6,400,808 | B1 | 6/2002 | Burg |
| 6,438,217 | B1 | 8/2002 | Huna |
| 6,529,592 | B1 | 3/2003 | Khan |
| 6,668,055 | B2 | 12/2003 | Marwell et al. |
| 6,721,397 | B1 | 4/2004 | Lu |
| 6,728,360 | B1 | 4/2004 | Brennan |
| 6,788,778 | B2 | 9/2004 | Tatsumi |
| 6,826,271 | B1 | 11/2004 | Kanabar et al. |
| 6,829,332 | B2 | 12/2004 | Farris et al. |
| 6,898,274 | B1 | 5/2005 | Galt et al. |
| 6,961,559 | B1 | 11/2005 | Chow et al. |
| 7,162,021 | B1 | 1/2007 | Johnson et al. |
| 7,269,412 | B2 | 9/2007 | Bacon et al. |
| 7,280,646 | B2 | 10/2007 | Urban et al. |
| 7,283,512 | B2 | 10/2007 | Hall |
| 7,295,656 | B2 | 11/2007 | Ruckart |
| 7,388,949 | B2 | 6/2008 | Contractor et al. |
| 7,474,432 | B1 | 1/2009 | Kirchhoff et al. |
| 7,609,832 | B2 | 10/2009 | Kreiner et al. |
| 7,672,444 | B2 | 3/2010 | Perrella et al. |
| 8,023,632 | B2 | 9/2011 | Gruchala |
| 8,031,851 | B2 | 10/2011 | Holt et al. |
| 2002/0039407 | A1 | 4/2002 | O'Donovan et al. |
| 2002/0086662 | A1 | 7/2002 | Culliss |
| 2003/0003900 | A1 | 1/2003 | Goss et al. |
| 2003/0058839 | A1 | 3/2003 | D'Souza |
| 2003/0060210 | A1 | 3/2003 | Ravishankar et al. |
| 2004/0028026 | A1 | 2/2004 | McClung et al. |
| 2004/0095925 | A1 | 5/2004 | Cody et al. |
| 2005/0053218 | A1 | 3/2005 | Kim |
| 2005/0054335 | A1 | 3/2005 | Pearson et al. |
| 2005/0064855 | A1 | 3/2005 | Russell |
| 2005/0100155 | A1 | 5/2005 | Trinkel et al. |
| 2005/0207361 | A1 | 9/2005 | Rosenberg et al. |
| 2005/0245236 | A1 | 11/2005 | Servi et al. |
| 2006/0029195 | A1 | 2/2006 | Mullis et al. |
| 2006/0177033 | A1 | 8/2006 | Allen et al. |
| 2006/0190591 | A1 | 8/2006 | Bobde et al. |
| 2007/0111743 | A1 | 5/2007 | Leigh et al. |
| 2007/0143397 | A1 | 6/2007 | Guedalia et al. |
| 2007/0147349 | A1 | 6/2007 | Bangor et al. |
| 2007/0153991 | A1 | 7/2007 | Daigle |
| 2007/0155370 | A1 | 7/2007 | Daigle |
| 2007/0263781 | A1 | 11/2007 | Goldman et al. |
| 2007/0299927 | A1 | 12/2007 | Knauerhase |
| 2009/0055502 | A1 | 2/2009 | Agarwal et al. |
| 2009/0086720 | A1 | 4/2009 | Westlake |
| 2009/0111474 | A1 | 4/2009 | Hill et al. |
| 2009/0247188 | A1 | 10/2009 | Ridley et al. |
| 2012/0106725 | A1 | 5/2012 | Smith et al. |

FOREIGN PATENT DOCUMENTS

| | | |
|---|---|---|
| EP | 1211875 | 6/2002 |
| EP | 1583341 | 10/2005 |
| EP | 1684478 | 7/2006 |
| GB | 2387737 | 1/2006 |
| JP | 2002016701 | 1/2002 |
| WO | 9107041 | 5/1991 |
| WO | 03041362 | 5/2003 |
| WO | 2006129296 | 12/2006 |
| WO | 2007033457 | 3/2007 |
| WO | 2007056824 | 5/2007 |
| WO | 2007071007 | 6/2007 |
| WO | WO2008042990 | 4/2008 |
| WO | 2008067631 | 6/2008 |
| WO | 2008077226 | 7/2008 |

OTHER PUBLICATIONS

Office Action issued on Sep. 10, 2012 in connection with U.S. Appl. No. 12/809,806, 15 pages.

Office Action issued on Oct. 5, 2012 in connection with U.S. Appl. No. 12/643,010, 9 pages.

Office Action issued on Oct. 15, 2012 in connection with U.S. Appl. No. 12/673,233, 12 pages.

Office Action issued on Nov. 8, 2012 in connection with U.S. Appl. No. 12/745,352, 22 pages.

Nunn, A., "Voice Evolution", BT Technology Journal, Kluwer Academic Publishers, DO, vol. 23, No. 1, Jan. 1, 2005, pp. 120-133, XP019218795, ISSN: 1573-1995, DOI: DOI: 10.1007/S10550-005-0113-3.

Extended European Search Report completed on Nov. 26, 2010 in connection with European Patent Application 07 85 5626, 4 pages.

Office Action issued on Mar. 15, 2012 in connection with U.S. Appl. No. 12/809,806, 9 pages.

Examiner's Report issued on Jun. 4, 2012 in connection with Canadian Patent Application 2,647,920, 2 pages.

Office Action issued on May 25, 2012 in connection with U.S. Appl. No. 12/673,233, 9 pages.

Supplementary European Search Report issued on May 22, 2012, in connection with European Patent Application 07855561, 6 pages.

Supplementary European Search Report completed on Nov. 26, 2010 in connection with European Patent Application 07 855 626, 4 pages.

Supplementary European Search Report completed on Sep. 30, 2011 in connection with European Patent 07 855 645, 7 pages.

One Voice Technologies, "Send E-mail. Voice-to-Text Messaging Solution", www.onev.com/solutions/mobile_send.asp, 2 pages.

International Search Report mailed on Aug. 21, 2008 in connection with International patent application PCT/CA2007/002323, 3 pages.

International Search Report mailed on Sep. 9, 2008 in connection with International patent application PCT/CA2007/002347, 6 pages.

Written Opinion of the International Searching Authority mailed Sep. 9, 2008 in connection with International patent application PCT/CA2007/002347, 10 pages.

International Search Report mailed on Sep. 9, 2008 in connection with International patent application PCT/CA2007/002279, 3 pages.

International Search Report mailed on Sep. 29, 2008 in connection with International patent application PCT/CA2007/002363, 4 pages.

International Search Report mailed on Sep. 17, 2008 in connection with International patent application PCT/CA2007/002346, 3 pages.

Tyson J. et al., "How VoIP Works", 2005, http://www.engedi.net/documents/HowVoIPWorks_Feb.pdf, Sep. 2008, 7 pages.

Written Opinion of the International Searching Authority mailed on Sep. 17, 2008 in connection with International patent application PCT/CA2007/002346, 6 pages.

International Search Report mailed on Sep. 19, 2008 in connection with International patent application PCT/CA2007/002364, 3 pages.

Written Opinion of the International Searching Authority mailed on Sep. 19, 2008 in connection with International patent application PCT/CA2007/002364, 4 pages.

"Google Voice", http://www.google.com/googlevoice/about.html, 1 page.

(56) References Cited

OTHER PUBLICATIONS

Written Opinion of the International Searching Authority mailed Aug. 21, 2008 in connection with International patent application PCT/CA2007/002323, 5 pages.

Written Opinion of the International Searching Authority mailed Sep. 9, 2008 in connection with International patent application PCT/CA2007/002279, 5 pages.

Written Opinion of the International Searching Authority mailed Sep. 29, 2008 in connection with International patent application PCT/CA2007/002363, 6 pages.

Written Opinion of the International Searching Authority mailed on Sep. 24, 2008 in connection with International patent application PCT/CA2007/002365, 5 pages.

International Search Report mailed on Sep. 24, 2008 in connection with International Patent Application PCT/CA2007/002365, 4 pages.

International Preliminary Report on Patentability completed on Mar. 10, 2010 in connection with International Patent Application PCT/CA2007/002362, 7 pages.

Office Action issued on Feb. 8, 2013 in connection with U.S. Appl. No. 12/809,711, 41 pages.

Office Action issued on Jan. 4, 2013 in connection with U.S. Appl. No. 12/809,407, 31 pages.

Office Action issued on Aug. 23, 2013 in connection with U.S. Appl. No. 12/809,711—45 pages.

Office Action issued on Aug. 15, 2013 in connection with U.S. Appl. No. 12/673,233—11 pages.

Examiner's Report issued on Aug. 12, 2013 in connection with Canadian Patent Application 2,710,245, 7 pages.

Office Action issued on Jun. 6, 2013 in connection with U.S. Appl. No. 12/674,262, 10 pages.

Office Action issued on Jul. 19, 2013 in connection with U.S. Appl. No. 12/745,352, 22 pages.

\* cited by examiner

METHOD AND APPARATUS FOR ENABLING A CALLING PARTY TO LEAVE A VOICE MESSAGE FOR A CALLED PARTY

CROSS-REFERENCE TO RELATED APPLICATION

This application claims priority from U.S. Provisional Patent Application No. 60/989,676 filed on Nov. 21, 2007 by Jonathan Arsenault et al. and hereby incorporated by reference herein.

FIELD OF THE INVENTION

The present invention relates generally to telecommunications and, more particularly, to a method and an apparatus for enabling a calling party to leave a voice message for a called party.

BACKGROUND

Voicemail systems enable a calling party having placed a call for a called party that subscribes to a voicemail service to leave a voice message for the called party when the call is not answered after a certain amount of time (e.g., a certain number of rings) or faces a busy signal. The called party may then access its voicemail system when desired and retrieve the voice message left by the calling party.

Unfortunately, in some cases, a called party does not subscribe to a voicemail service. In other cases, a called party subscribing to a voicemail service may have chosen voicemail settings that are undesirable for a calling party having placed a call for the called party and/or may not regularly check its voicemail account.

There thus exists a need for solutions directed to enabling a calling party to leave a voice message for a called party, particularly in situations where the called party does not subscribe to a voicemail service or subscribes to a voicemail service that the calling party does not wish to use.

SUMMARY OF THE INVENTION

As embodied and broadly described herein, the present invention provides a network apparatus for allowing a calling party to leave a message for a called party, the calling party using a communication device to call the called party. The network apparatus comprises an interface for communicating with the communication device via a communications network. The network apparatus also comprises a processing unit coupled to the interface and operative for: consulting at least one source of information in an attempt to obtain message destination information associated with the called party; if the attempt is successful, providing an opportunity for the calling party to leave a message for the called party; receiving a voice message provided by the calling party via the communication device; generating an electronic message representative of the voice message provided by the calling party; and causing transmission of the electronic message based on the message destination information.

As embodied and broadly described herein, the present invention also provides a method for execution by a network entity to allow a calling party to leave a message for a called party, the calling party using a communication device to call the called party, the network entity being connected to the communication device via a communications network. The method comprises: consulting at least one source of information in an attempt to obtain message destination information associated with the called party; if the attempt is successful, providing an opportunity for the calling party to leave a message for the called party; receiving a voice message provided by the calling party via the communication device; generating an electronic message representative of the voice message provided by the calling party; and causing transmission of the electronic message based on the message destination information.

As embodied and broadly described herein, the present invention also provides computer-readable media storing a program element for execution by a computer system to allow a calling party to leave a message for a called party, the calling party using a communication device to call the called party, the computer system being connected to the communication device via a communications network. The program element comprises: first program code for causing the computer system to consult at least one source of information in an attempt to obtain message destination information associated with the called party; second program code for causing the computer system, if the attempt is successful, to provide an opportunity for the calling party to leave a message for the called party; third program code for causing the computer system to receive a voice message provided by the calling party via the communication device; fourth program code for causing the computer system to generate an electronic message representative of the voice message provided by the calling party; and fifth program code for causing the computer system to cause transmission of the electronic message based on the message destination information.

As embodied and broadly described herein, the present invention also provides a network apparatus for allowing a calling party to leave a message for a called party, the calling party using a communication device to call the called party. The network apparatus comprises an interface for communicating with the communication device via a communications network. The network apparatus also comprises a processing unit coupled to the interface and operative for: consulting a record associated with the calling party to obtain message destination information associated with the called party; receiving a voice message provided by the calling party via the communication device; generating an electronic message representative of the voice message; and causing transmission of the electronic message based on the message destination information.

As embodied and broadly described herein, the present invention also provides a method for execution by a network entity to allow a calling party to leave a message for a called party, the calling party using a communication device to call the called party, the network entity being connected to the communication device via a communications network. The method comprises: consulting a record associated with the calling party to obtain message destination information associated with the called party; receiving a voice message provided by the calling party via the communication device; generating an electronic message representative of the voice message; and causing transmission of the electronic message based on the message destination information.

As embodied and broadly described herein, the present invention also provides computer-readable media storing a program element for execution by a computer system to allow a calling party to leave a message for a called party, the calling party using a communication device to call the called party, the computer system being connected to the communication device via a communications network. The program element comprises: first program code for causing the computer system to consult a record associated with the calling party to obtain message destination information associated with the called party; second program code for causing the computer system to receive a voice message provided by the calling party via the communication device; third program code for causing the computer system to generate an electronic message representative of the voice message; and fourth program code for causing the computer system to cause transmission of the electronic message based on the message destination information.

As embodied and broadly described herein, the present invention also provides a network apparatus for allowing a calling party to leave a message for a called party, the calling party using a communication device to call the called party. The network apparatus comprises an interface for communicating with the communication device via a communications network. The network apparatus also comprises a processing unit coupled to the interface and operative for: determining whether the calling party subscribes to a messaging service; if the calling party subscribes to the messaging service, providing an opportunity for the calling party to leave a message for the called party; consulting at least one source of information to obtain message destination information associated with the called party; receiving a voice message provided by the calling party via the communication device; generating an electronic message representative of the voice message; and causing transmission of the electronic message based on the message destination information.

As embodied and broadly described herein, the present invention also provides a method for execution by a network entity to allow a calling party to leave a message for a called party, the calling party using a communication device to call the called party, the network entity being connected to the communication device via a communications network. The method comprises: determining whether the calling party subscribes to a messaging service; if the calling party subscribes to the messaging service, providing an opportunity for the calling party to leave a message for the called party; consulting at least one source of information to obtain message destination information associated with the called party; receiving a voice message provided by the calling party via the communication device; generating an electronic message representative of the voice message; and causing transmission of the electronic message based on the message destination information.

As embodied and broadly described herein, the present invention also provides a network apparatus for allowing a calling party to leave a message for a called party, the calling party using a communication device to call the called party. The network apparatus comprises an interface for communicating with the communication device via a communications network. The network apparatus also comprises a processing unit coupled to the interface and operative for: obtaining message destination information associated with the called party; interacting with the communication device to obtain a voice message provided by the calling party via the communication device, the interacting being independent of whether the called party subscribes to a voicemail service; generating an electronic message representative of the voice message; and causing transmission of the electronic message based on the message destination information.

As embodied and broadly described herein, the present invention also provides a method for execution by a network entity to allow a calling party to leave a message for a called party, the calling party using a communication device to call the called party, the network entity being connected to the communication device via a communications network. The method comprises: obtaining message destination information associated with the called party; interacting with the communication device to obtain a voice message provided by the calling party via the communication device, the interacting being independent of whether the called party subscribes to a voicemail service; generating an electronic message representative of the voice message; and causing transmission of the electronic message based on the message destination information.

These and other aspects of the invention will become apparent to those of ordinary skill in the art upon review of the following description of example embodiments of the invention in conjunction with the accompanying drawings.

BRIEF DESCRIPTION OF THE DRAWINGS

A detailed description of example embodiments of the present invention is provided herein below, by way of example only, with reference to the accompanying drawings, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
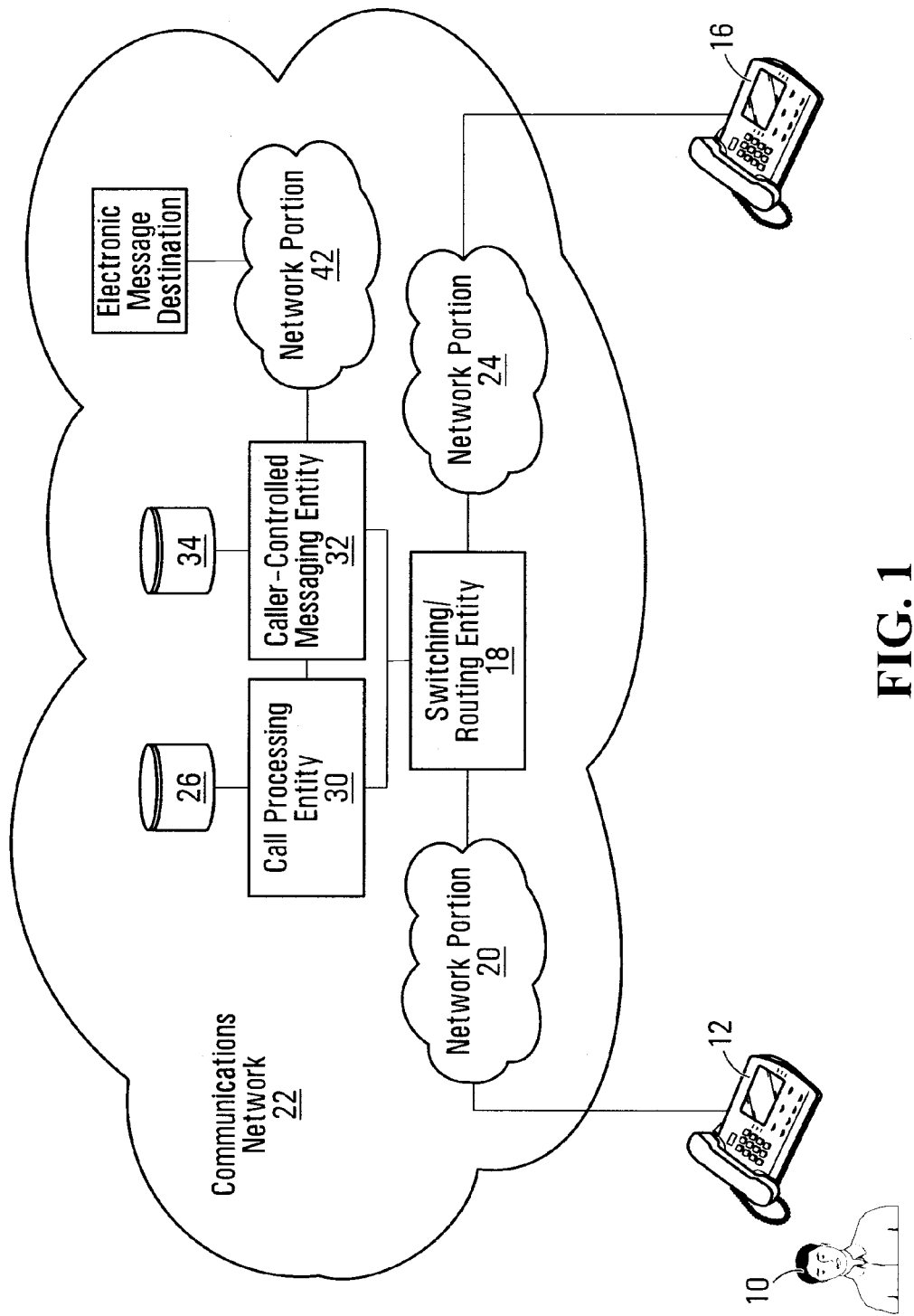
FIG. 1 shows a communications network allowing a user of a communication device to effect telephonic communications, the communications network comprising a network entity providing a caller-controlled messaging service in accordance with an embodiment of the invention.

FIG. 1 shows a communications network 22 allowing a user 10 of a communication device 12 to effect telephonic communications, including receiving an incoming call originating from a calling party device, originating an outgoing call destined for a called party device, and participating in a call in progress. For example, in various embodiments, the communication device 12 may be a wired Plain Old Telephony System (POTS) phone (including a cordless phone), a wireless phone (e.g., a cellular phone or other mobile communication device, including a telephony-enabled personal digital assistant (PDA)), a Voice-over-Internet Protocol (VoIP) phone, a POTS phone equipped with an analog terminal adapter (ATA), a softphone (i.e., a computer equipped with telephony software), or a telephony-enabled television unit (e.g., a set-top box connected to a television and a remote control). Depending on functionality of the communication device 12, a call originated by, destined for, or in progress at the communication device 12 may be a voice call, a video call, a multimedia call, or any other type of call.

The communication device 12 is connected to a switching/routing entity 18 via a network portion 20 of the communications network 22. The switching/routing entity 18 enables the communication device 12 to reach or be reached by any of various communication devices, such as a communication device 16. For example, in various example scenarios, the communication device 16 may be a wired POTS phone, a wireless phone, a VoIP phone, an ATA-equipped POTS phone, a softphone, or a telephony-enabled television unit. The communication device 16 is connected to the switching/routing entity 18 via a network portion 24 of the communications network 22.

The communications network 22 may comprise a portion of one or more of the Public Switched Telephone Network (PSTN), a wireless network (e.g., a cellular network), and a data network (e.g., the Internet).

The nature of the network portion 20 and the switching/routing entity 18 will depend on the nature of the communication device 12 and where the switching/routing entity 18 resides in the communications network 22. For example, where the communication device 12 is a wired POTS phone and the switching/routing entity 18 resides in the PSTN, the network portion 20 may comprise a telephone line in the PSTN and the switching/routing entity 18 may be part of a central office switch. As another example, where the communication device 12 is a wireless phone and the switching/routing entity 18 resides in a wireless network, the network portion 20 may comprise a wireless link in combination with a base station and a wireline link, and the switching/routing entity 18 may be part of a mobile switching center. As yet another example, where the communication device 12 is a VoIP phone or an ATA-equipped POTS phone and the switching/routing entity 18 resides in a data network, the network portion 20 may comprise a digital communications link (e.g., a digital subscriber line (DSL) link, a cable link, or a wireless data link such as a WiMAX link) and the switching/routing entity 18 may be part of a softswitch or a router (e.g., an edge router or a core router). As yet another example, where the communication device 12 is a softphone, the network portion 20 may comprise a digital communications link and the switching/routing entity 18 may be part of a server equipped with a modem. It will be appreciated that various other implementations of the network portion 20 and the switching/routing entity 18 are possible (e.g., where the communication device 12 is a telephony-enabled television unit). It will also be appreciated that the network portion 20 may span across different networks (e.g., PSTN, wireless, and/or data networks) in which case it may comprise one or more gateways enabling communication and interoperability between these networks. Such gateways are well known and need not be described in further detail.

Similarly, the nature of the network portion 24 will depend on the nature of the communication device 16 and where the switching/routing entity 18 resides in the communications network 22. Thus, the network portion 24 may comprise, for example, one or more of a telephone line in the PSTN, a wireless link in combination with a base station and a wireline link, a digital communications link, and one or more gateways enabling communication and interoperability between different networks.

The switching/routing entity 18 is operative to effect switching/routing operations to help establish a call originated at the communication device 12 and destined for a called party device (e.g., the communication device 16) or a call originated at a calling party device (e.g., the communication device 16) and destined for the communication device 12. Furthermore, the switching/routing entity 18 is operative to interact with a call processing entity 30, which is described later on, when the communication device 12 is used to originate an outgoing call, handle an incoming call, or participate in a call in progress.

The switching/routing entity 18 comprises suitable hardware, firmware, software, control logic, or a combination thereof for implementing a plurality of functional components, including an interface and a processing unit. The interface of the switching/routing entity 18 is adapted to receive and send signals over the network portions 20 and 24 to communicate with communication devices (such as the communication devices 12 and 16). The interface of the switching/routing entity 18 is also adapted to allow interaction between the switching/routing entity 18 and one or more other network entities, including the call processing entity 30. The processing unit of the switching/routing entity 18 is adapted to effect various processing operations to implement that entity's functionality.

Figure 2:
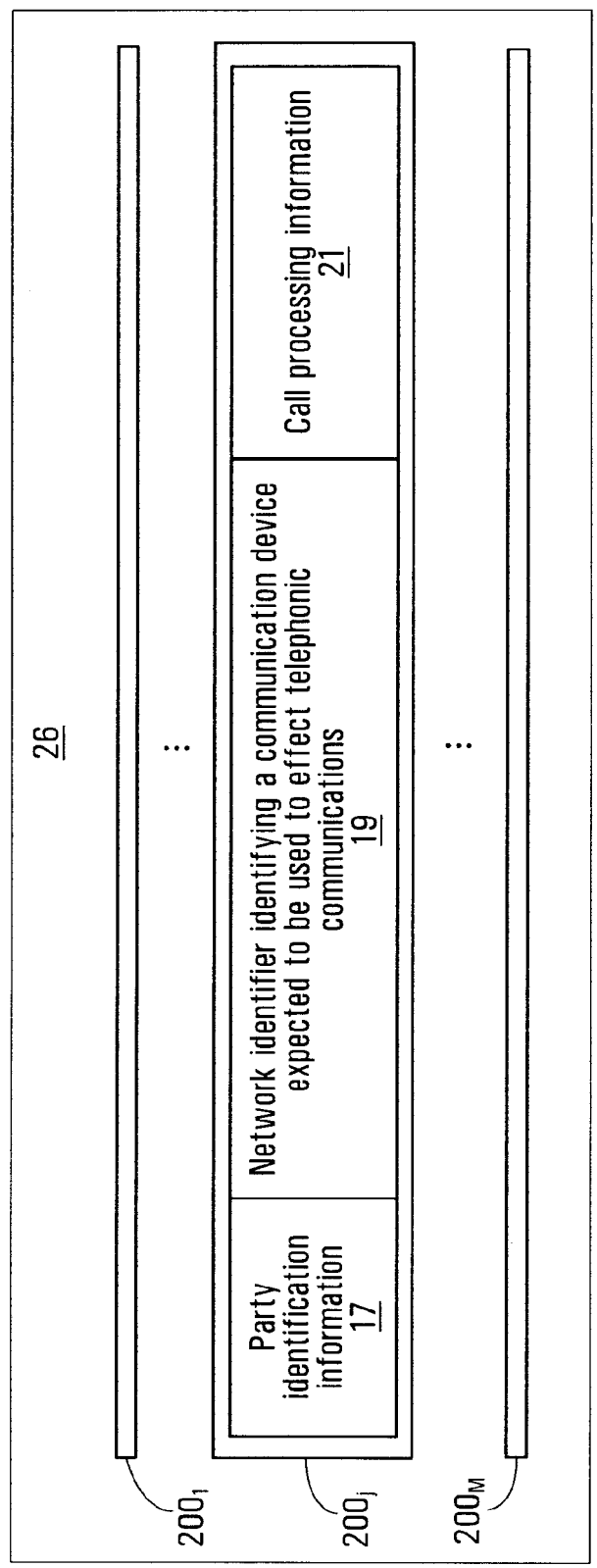
FIG. 2 shows an example of potential contents of a first database of the communications network.

The call processing entity 30 has access to a database 26. FIG. 2 shows an example of potential contents of the database 26. In this example, the database 26 stores a plurality of records $200_1$-$200_M$. Each of the records $200_1$-$200_M$ is associated with a party, which may be a customer of a service provider operating the call processing entity 30 and which may be a potential calling party as well as a potential called party.

In this example, a given record $200_j$ of the records $200_1$-$200_M$ includes party identification information 17 identifying the party associated with the record $200_j$. For instance, the party identification information 17 may include one or more of a name, an account number and a customer number.

The record $200_j$ also includes at least one network identifier 19 directly or indirectly identifying a communication device expected to be used by the party associated with the record $200_j$ to effect telephonic communications (and possibly other communications) over the communications network 22. The network identifier 19 may take on various forms for various types of communication devices. For example: for a wired POTS phone, the network identifier 19 may include a telephone number identifying a telephone line to which the wired POTS phone is connected; for a wireless phone, the network identifier 19 may include an electronic serial number (ESN) and/or a telephone number associated with the wireless phone; for a VoIP phone, ATA-equipped POTS phone, or softphone, the network identifier 19 may include an Internet Protocol (IP) address and/or a telephone number (and/or another Uniform Resource Identifier (URI) such as a Session Initiation Protocol (SIP) URI) associated with the VoIP phone, ATA-equipped POTS phone, or softphone. It will be recognized that the network identifier 19 may take on other forms (e.g., Electronic Numbering (ENUM) information).

In addition, the record $200_j$ includes call processing information 21 associated with the party that is associated with the record $200_j$. The call processing information 21 indicates how calls involving the party associated with the record $200_j$, i.e., calls originated by or destined for that party, are to be processed by the call processing entity 30. The call processing information 21 may be configurable in order to allow processing of calls involving the party associated with the record $200_j$ as intended by that party.

The call processing information 21 in the record $200_j$ can take on many forms. In this example, the call processing information 21 includes telephony service information indicative of whether the party associated with the record $200_j$ subscribes to zero or more telephony services. This telephony service information can be used during processing of calls by the call processing entity 30 in order to apply any telephony service subscribed to by the party associated with the record $200_j$.

One example of a telephony service that may be subscribed to is a voicemail service, which enables the party associated with the record $200_j$ to access a voicemail system and retrieve one or more voice messages recorded in the voicemail system and left by one or more calling parties that unsuccessfully attempted to reach the party associated with the record $200_j$. Other examples of telephony services that may be subscribed to include a call forwarding service, a "find me/follow me" call forwarding service, a distinctive ringing service, a selective call rejection service, a selective call acceptance service, a call waiting service, a calling line identification (CLID) displaying service, a CLID blocking service, an outgoing call barring service, etc.

In accordance with an embodiment of the present invention, one telephony service that may be subscribed to is a "caller-controlled messaging service". As further discussed later on, the caller-controlled messaging service enables a calling party that calls a called party to leave a voice message for the called party independently of whether the called party subscribes to a voicemail service (i.e., whether or not the called party subscribes to a voicemail service), whereby the voice message is conveyed to the called party by way of an electronic message (e.g., an electronic mail (email) message, a text message (e.g., a Short Message Service (SMS) message), a multimedia message (e.g., a Multimedia Message Service (MMS) message), or an instant messaging (IM) message).

Subscription to different telephony services may be completely independent from one party to another and there may be no restriction on a number or combination of services that may be subscribed to by any one party. In some cases, a party may not subscribe to any telephony service, while in other cases a party may subscribe to some or all available telephony services. Also, in some cases, one or more telephony services (including the caller-controlled messaging service contemplated herein) may be subscribed to by a party without the party having to pay for these one or more services, which may be provided to the party as default or standard services.

With renewed reference to FIG. 1, the call processing entity 30 is operative to interact with the switching/routing entity 18 and the database 26 in order to effect various call processing operations when a communication device (such as the communication device 12) connected to the switching/routing entity 18 is destined to receive an incoming call or is used to originate an outgoing call or participate in a call in progress.

More particularly, the call processing entity 30 is operative to process calls established via the switching/routing entity 18. Processing of a given call by the call processing entity 30 can be viewed as the call processing entity 30 performing one or more operations to process the given call. For example, a given call may be processed based on a set of rules, where each rule may be defined by a condition as well as an operation to be performed if the condition is satisfied for the given call and/or an operation to be performed if the condition is not satisfied for the given call. For a given rule, the condition may be defined in terms of one or more characteristics of a call. Examples of characteristics of a call are: its origin, which may be expressed, for instance, as a telephone number or other identifier (e.g., an IP address or SIP URI) identifying a device that originated the call or as a name or other identifier of a calling party that originated the call; its intended destination, which may be expressed, for instance, as a telephone number or other identifier (e.g., an IP address or SIP URI) identifying a device for which the call is destined or as a name or other identifier of a called party for which the call is destined; and a time at which it was originated (e.g., a date, hour, minute, etc.). For a given rule, the condition may also be defined in terms of call processing information 21 included in one of the records $200_1$-$200_M$ of the database 26. For a given rule, the operation to be performed based on whether the condition is satisfied depends on the nature of the given rule (e.g., route a call to its intended destination, forward a call in accordance with a call forwarding service, etc.).

The call processing entity 30 comprises suitable hardware, firmware, software, control logic, or a combination thereof for implementing a plurality of functional components, including an interface and a processing unit. The interface of the call processing entity 30 is adapted to receive and send signals over the network portions 20 and 24 via the switching/routing entity 18 to communicate with communication devices (such as the communication devices 12 and 16). The interface of the call processing entity 30 is also adapted to allow interaction between the call processing entity 30 and one or more other network entities, including the switching/routing entity 18. The processing unit of the call processing entity 30 is adapted to effect various processing operations to implement that entity's functionality.

In accordance with an embodiment of the present invention, there is provided a "caller-controlled messaging entity" 32 for implementing the caller-controlled messaging service contemplated herein.

As further described below, when a calling party uses a given communication device (e.g., the user 10 using the communication device 12) to call a called party, the caller-controlled messaging entity 32 enables the calling party to leave a voice message for the called party independently of whether the called party subscribes to a voicemail service (i.e., whether or not the called party subscribes to a voicemail service). In other words, the caller-controlled messaging entity 32 provides an opportunity for the calling party to leave a voice message for the called party without requiring that the called party subscribe to a voicemail service. More particularly, the caller-controlled messaging entity 32 can interact with the calling party via the given communication device to obtain a voice message for the called party independently of whether the called party subscribes to a voicemail service. The caller-controlled messaging entity 32 can then generate an electronic message (e.g., an email message, a text message, a multimedia message, or an IM message) representative of the voice message and cause transmission of the electronic message to a destination associated with the called party. Thus, by virtue of the caller-controlled messaging entity 32, the calling party is capable of leaving a voice message for the called party whether the called party does or does not subscribe to a voicemail service. From the calling party's perspective, this is particularly useful in situations where the called party does not subscribe to a voicemail service or where the called party subscribes to a voicemail service that the calling party does not wish to use.

In order to be able to cause transmission of an electronic message to a destination associated with a particular called party, the caller-controlled messaging entity 32 can consult one or more sources of information in an attempt to obtain "message destination information" associated with the particular called party. This message destination information is information specifying at least one destination to which can be sent an electronic message intended for the particular called party. For example, the message destination information associated with the particular called party may include one or more of: an email address associated with the particular called party; a telephone number or other identifier identifying a communication device associated with the particular called party and to which can be sent a text message or a multimedia message; and IM identifier associated with the particular called party.

Figure 3:
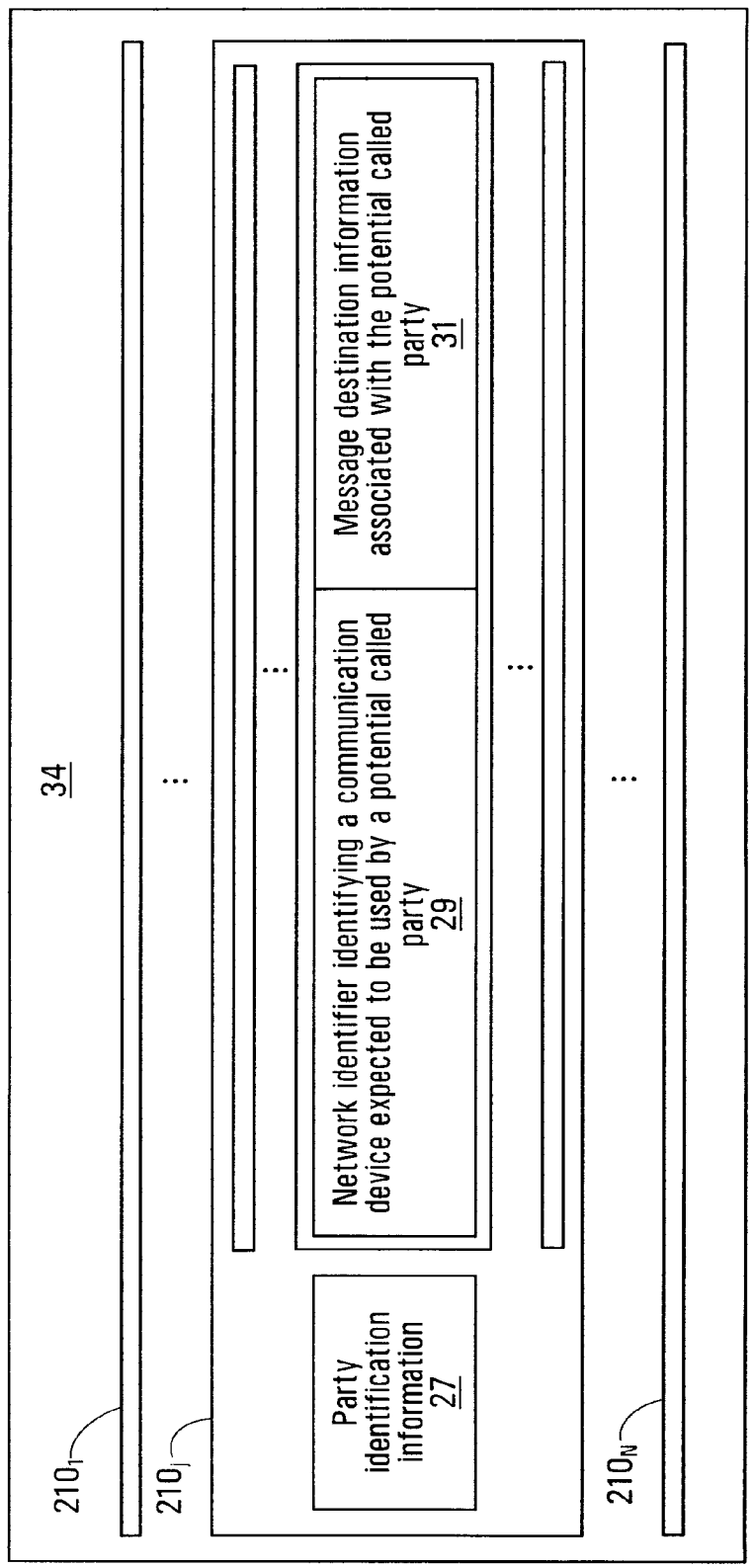
FIG. 3 shows an example of potential contents of a second database of the communications network for consultation by the network entity providing the caller-controlled messaging service.

In this embodiment, one source of information that the caller-controlled messaging entity 32 can consult is a database 34. FIG. 3 shows an example of potential contents of the database 34. In this example, the database 34 stores a plurality of records $210_1$-$210_N$. Each of the records $210_1$-$210_N$ is associated with a party subscribing to the caller-controlled messaging service contemplated herein.

A given record $210_j$ of the records $210_1$-$210_N$ includes party identification information 27 (e.g., a name, account number and/or customer number) identifying the party associated with the record $210_j$. The record $210_j$ also includes one or more entries, where each entry is associated with a potential called party and includes a network identifier 29 and message destination information 31 associated with that potential called party.

The network identifier 29 in an entry of the record $210_j$ directly or indirectly identifies a communication device expected to be used by the potential called party associated with that entry. The network identifier 29 may take on various forms for various types of communication devices. For example: for a wired POTS phone, the network identifier 29 may include a telephone number identifying a telephone line to which the wired POTS phone is connected; for a wireless phone, the network identifier 29 may include an ESN and/or a telephone number associated with the wireless phone; for a VoIP phone, ATA-equipped POTS phone, or softphone, the network identifier 19 may include an IP address and/or a telephone number (and/or another URI such as a SIP URI) associated with the VoIP phone, ATA-equipped POTS phone, or softphone. It will be recognized that the network identifier 29 may take on other forms (e.g., Electronic Numbering (ENUM) information).

The message destination information 31 in an entry of the record $210_j$ specifies at least one destination to which can be sent an electronic message intended for the potential called party associated with that entry. For example, the message destination information 31 may include one or more of: an email address associated with the potential called party; a telephone number or other identifier identifying a communication device associated with the potential called party and to which can be sent a text message or a multimedia message; and an IM identifier associated with the potential called party. It will be recognized that the message destination information 31 may take on other forms.

Thus, in this case, the record $210_j$ can be viewed as part of an address book of the party associated with that record. Information contained in the record $210_j$ may be configured by the party associated with that record during a provisioning phase (e.g., via a data network site (e.g., a web site) operated by a service provider serving that party).

With renewed reference to FIG. 1, upon generating an electronic message representative of a voice message that has been left by a calling party for a called party, the caller-controlled messaging entity 32 can cause transmission of the electronic message to at least one destination specified by the message destination information 31 associated with the called party. More particularly, in this embodiment, the caller-controlled messaging entity 32 can transmit the electronic message via a network portion 42 of the communications network 22. The nature of the network portion 42 will depend on the nature of the electronic message. For example: where the electronic message is an email message, the network portion 42 may comprise a data network portion; where the electronic message is a text message or a multimedia message, the network portion 42 may comprise a wireless network portion; and where the electronic message is an IM message, the network portion 42 may comprise a data network portion. In other embodiments, the caller-controlled messaging entity 32 can cause transmission of the electronic message by causing another network entity (e.g., an email server) to transmit the electronic message.

The caller-controlled messaging entity 32 comprises suitable hardware, firmware, software, control logic, or a combination thereof for implementing a plurality of functional components, including an interface and a processing unit. The interface of the caller-controlled messaging entity 32 is adapted to receive and send signals over the network portions 20 and 24 via the switching/routing entity 18 to communicate with communication devices (such as the communication devices 12 and 16). The interface of the caller-controlled messaging entity 32 is also adapted to allow interaction between the caller-controlled messaging entity 32 and one or more other network entities, including the call processing entity 30 and the switching/routing entity 18. In this embodiment, the interface of the caller-controlled messaging entity 32 is further adapted to allow transmission of electronic messages over the network portion 42. The processing unit of the caller-controlled messaging entity 32 is adapted to effect various processing operations to implement that entity's functionality.

In some embodiments, the switching/routing entity 18, the call processing entity 30, and the caller-controlled messaging entity 32 may be part of a common network element of the communications network 22. In such embodiments, different ones of these entities may be physical entities linked by physical (i.e., wired or wireless) links or logical entities linked by logical links. As such, the interface of each of these entities may include a physical interface portion and/or a logical interface portion. In other embodiments, different ones of the switching/routing entity 18, the call processing entity 30, and the caller-controlled messaging entity 32 may be part of different network elements of the communications network 22 that are interconnected via one or more physical links and possibly other elements (e.g., gateways) of the communications network 22. Also, although it is depicted in FIG. 1 as being one component, each of the database 26 and the database 34 may be distributed in nature, i.e., it can have portions of its content stored in different memory units possibly located in different network elements of the communications network 22. In addition, although they are shown as distinct components in FIG. 1, the database 26 and the database 34 may in some embodiments be part of a common database.

Figure 4:
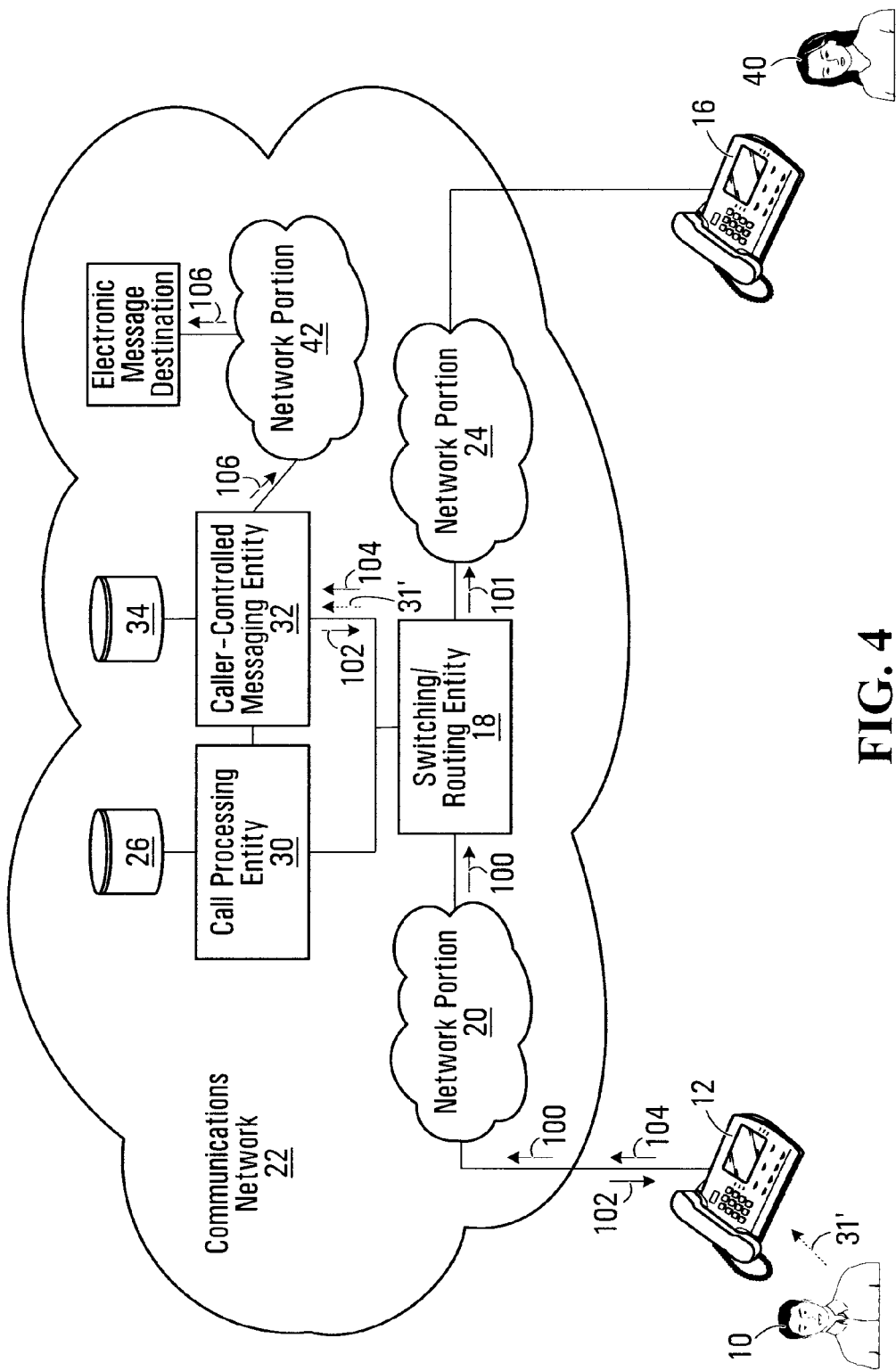
FIG. 4 shows an example of interaction between the user of the communication device and the network entity providing the caller-controlled messaging service, when the user uses the communication device to call a called party.

Referring now to FIG. 4, operation of the caller-controlled messaging entity 32 will be illustrated in the context of an example in which the user 10 uses the communication device 12 to call a called party 40 associated with the communication device 16. For example, the user 10 may interact with the communication device 12 to dial a telephone number associated with the called party 40, select a contact identifier of the called party 40 from a contact function implemented by the communication device 12, or speak a voice command to call the called party 40. This interaction of the user 10 with the communication device 12 results in the communication device 12 transmitting a signal 100 over the network portion 20, the signal 100 pertaining to a call to be established between the communication device 12 and the communication device 16. For example, and depending on the nature of the network portion 20 and the nature of the interaction of the user 10 with the communication device 12, the signal 100 may convey one or more dual-tone multi-frequency (DTMF) tones, one or more data packets, or other information pertaining to a call to be established between the communication device 12 and the communication device 16. The signal 100 travels over the network portion 20 towards the switching/routing entity 18, possibly being processed by one or more entities (e.g., gateways, switching/routing entities, etc.) that may be part of the network portion 20.

The signal 100 may be transmitted by the communication device 12 and received at the switching/routing entity 18 in various manners, depending on the nature of the communication device 12 and where the switching/routing entity 18 resides in the communications network 22. For example: where the communication device 12 is a wired POTS phone and the switching/routing entity 18 resides in the PSTN, the signal 100 may be transmitted by the communication device 12 and received at the switching/routing entity 18 following detection of an off-hook condition of the communication device 12 by the switching/routing entity 18; where the communication device 12 is a wireless phone and the switching/routing entity 18 resides in a wireless network, the signal 100 may be transmitted by the communication device 12 and received at the switching/routing entity 18 further to the user 10 inputting a command into the communication device 12 (e.g., by pressing a "send" or "talk" button); where the communication device 12 is a VoIP phone, softphone or ATA-equipped POTS phone and the switching/routing entity 18 resides in a data network, the signal 100 may be transmitted by the communication device 12 and received at the switching/routing entity 18 after the user 10 has input into the communication device 12 information indicative of a destination of the call (e.g., by entering a telephone number); etc.

Upon reception of the signal 100 at the switching/routing entity 18, the call processing entity 30 determines, based on information conveyed by the signal 100 (e.g., origination and destination telephone numbers), that the signal 100 pertains to a call to be established between the communication device 12 and the communication device 16. Since, from the perspective of the call processing entity 30, the user 10 is a party that calls the called party 40 using the communication device 12, the user 10 will hereinafter be referred to as a calling party. It is noted however that, although he/she is considered to be the calling party from the perspective of the call processing entity 30, the user 10 himself/herself may not necessarily be a customer of the service provider operating the call processing entity 30.

The call processing entity 30 proceeds to perform call processing operations in respect of the call to which pertains the signal 100 based on the aforementioned set of rules. For one or more of these rules, the call processing entity 30 may have to use call processing information 21 associated with the calling party 10. In particular, the call processing entity 30 may have to determine whether the calling party 10 subscribes to one or more telephony services and, if so, to perform one or more call processing operations in accordance with these one or more telephony services. To that end, the call processing entity 30 consults the database 26 to access a particular one of the records $200_1$-$200_M$ associated with the calling party 10 so as to determine whether the calling party 10 subscribes to one or more telephony services. For purposes of this example, it is assumed that the call processing entity 30 determines that the calling party 10 subscribes to the caller-controlled messaging service contemplated herein.

Upon determining that the call to which pertains the signal 100 is destined for the communication device 16 associated with the called party 40, the call processing entity 30 causes the switching/routing entity 18 to transmit a signal 101 over the network portion 24 so as to route the call to the communication device 16.

In this example, it is assumed that the call fails to be established, i.e., the call fails to establish a communication path supporting voice communication between the communication device 12 and the communication device 16. The call can be deemed to have failed to be established if it remains unanswered for a certain period of time (e.g., for a certain number of rings) or faces a busy signal (indicating that the communication device 16 is in a busy state). For instance, this may result from there being no one around the communication device 16 to answer the call, the called party 40 not wanting to answer the call, or someone already using the communication device 16 to participate in another call. Alternatively, in some embodiments, the call processing entity 30 (or another network entity in communication therewith) may have access to presence information regarding the called party 40, in which case the call processing entity 30 (or the other network entity in communication therewith) may deem that the call failed to be established when the presence information indicates that the called party 40 is unavailable. With the call having failed to be established, different scenarios are possible.

In a first possible scenario, the called party 40 subscribes to a voicemail service, which may be provided by the service provider operating the call processing entity 30 or another service provider operating another network entity part of the network portion 24. In this first scenario, the call processing entity 30 or the other network entity may invoke a voicemail system associated with the called party 40 (hereinafter referred to as a "called party voicemail system") that enables the calling party 10 to leave a voice message for the called party 40, which voice message can be subsequently retrieved by the called party 40 upon accessing the called party voicemail system. Alternatively or additionally, in this first scenario, upon determining that the call failed to be established, the call processing entity 30 may cause the caller-controlled messaging entity 32 to perform a process (described below) with a view to allow the calling party 10 to leave a voice message for the called party 40, without intervention of the called party voicemail system. A determination as to whether to employ the called party voicemail system or the caller-controlled messaging entity 32 to allow the calling party 10 to leave a voice message for the called party 40 can be effected by the call processing entity 30 based on: (1) the call processing information 21 (e.g., preferences, setup options, etc.) in the particular one of the records $200_1$-$200_M$ of the database 26 associated with the calling party 10 (e.g., the call processing information 21 may specify a period of time or a number of rings that the calling party 10 wants to wait for before the caller-controlled messaging service is invoked); or (2) a command provided by the calling party 10 via the communication device 12 (possibly after being prompted by the call processing entity 30 via the communication device 12 to specify which of the called party voicemail system or the caller-controlled messaging entity 32 the calling party 10 desires to use).

In a second possible scenario, the called party 40 does not subscribe to a voicemail service. In this second scenario, upon determining that the call failed to be established, the call processing entity 30 may cause the caller-controlled messaging entity 32 to perform a process (described below) with a view to allow the calling party 10 to leave a voice message for the called party 40, despite the fact that the called party 40 does not subscribe to a voicemail service.

Thus, in either of these possible scenarios, the caller-controlled messaging entity 32 enables the calling party 10 to leave a voice message for the called party 40 independently of whether the called party 40 subscribes to a voicemail service (i.e., whether or not the called party 40 subscribes to a voicemail service). In other words, the caller-controlled messaging entity 32 can provide an opportunity for the calling party 10 to leave a voice message for the called party 40 without requiring that the called party 40 subscribe to a voicemail service.

For purposes of this example, it is assumed that, upon determining that the call failed to be established, the call processing entity 30 causes the caller-controlled messaging entity 32 to perform a process with a view to allow the calling party 10 to leave a voice message for the called party 40.

As part of this process, the caller-controlled messaging entity 32 consults at least one source of information in an attempt to obtain message destination information associated with the called party 40. More particularly, in this embodiment, the caller-controlled messaging entity 32 consults the database 34 in an attempt to find message destination information associated with the called party 40. In this case, the caller-controlled messaging entity 32 consults the database 34 to identify a particular one of the records $210_1$-$210_N$ that is associated with the calling party 10. Upon identifying the particular one of the records $210_1$-$210_N$, the caller-controlled messaging entity 32 searches that record in an attempt to find an entry including a network identifier 29 identifying the communication device 16 expected to be used by the called party 40.

If the particular one of the records $210_1$-$210_N$ contains an entry including a network identifier 29 that identifies the communication device 16, the caller-controlled messaging entity 32 finds this entry and obtains therefrom the message destination information 31 associated with the called party 40. Thus, in this case, the attempt of the caller-controlled messaging entity 32 to obtain message destination information associated with the called party 40 is successful.

If the particular one of the records $210_1$-$210_N$ does not contain an entry including a device identifier 29 that identifies the communication device 16, the caller-controlled messaging entity 32 concludes that no message destination information 31 associated with the called party 40 is available in that record. In this case, the attempt of the caller-controlled messaging entity 32 to obtain message destination information associated with the called party 40 is unsuccessful. The caller-controlled messaging entity 32 may inform the calling party 10 (e.g., by sending a message to the communication device 12) that he/she may not leave a voice message for the called party 40 in view of this lack of message destination information associated with the called party 40.

In some cases, when the attempt of the caller-controlled messaging entity 32 to obtain message destination information associated with the called party 40 from the particular one of the records $210_1$-$210_N$ is unsuccessful, the caller-controlled messaging entity 32 may consult one or more other sources of information in an attempt to obtain message destination information associated with the called party 40.

For instance, in some embodiments, one source of information that the caller-controlled messaging entity 32 may consult is the calling party 10 himself/herself. In such embodiments, the caller-controlled messaging entity 32 may provide an opportunity for the calling party 10 to supply message destination information associated with the called party 40. For example, the caller-controlled messaging entity 32 may send a pre-recorded message to the communication device 12 inviting the calling party 10 to supply message destination information associated with the called party 40 via the communication device 12. The calling party 10 may then interact with the communication device 12 (e.g., by pressing on one or more buttons and/or speaking one or more utterances) to supply message destination information 31' associated with the called party 40. As another example, in some embodiments, the caller-controlled messaging entity 32 may have knowledge (e.g., based on information contained in the database 26 or the database 34) that the calling party 10 is associated with another communication device (e.g., a computer, a wireless phone, etc.) that may make it easier or more convenient for the calling party 10 to supply message destination information associated with the called party 40. In such embodiments, the caller-controlled messaging entity 32 may send a message to this other communication device to invite the calling party 10 to supply message destination information associated with the called party 40 via this other communication device. The calling party 10 may then interact with the other communication device to supply message destination information 31' associated with the called party 40 in response to the message sent by the caller-controlled messaging entity 32. In a situation where the calling party 10 does supply message destination information 31' associated with the called party 40, the attempt of the caller-controlled messaging entity 32 to obtain message destination information associated with the called party 40 is successful.

For purposes of this example, it is assumed that the caller-controlled messaging entity 32 obtains message destination information 31, 31' associated with the called party 40, either from the database 34 or from the calling party 10. In response, the caller-controlled messaging entity 32 interacts with the calling party 10 to obtain a voice message for the called party 40.

More particularly, the caller-controlled messaging entity 32 provides an opportunity for the calling party 10 to leave a voice message for the called party 40. For example, in this embodiment, the caller-controlled messaging entity 32 sends a message 102 to the communication device 12, the message 102 inviting the calling party 10 to leave a voice message for the called party 40 (e.g., "Please leave your message after the tone"). The message 102 may be a voice message generated by the caller-controlled messaging entity 32. Alternatively, where the communication device 12 has a display screen, the message 102 may be a displayable message for display on the display screen of the communication device 12.

Upon receiving the message 102, the communication device 12 presents it to the calling party 10. The calling party 10 then decides whether he/she desires to leave a voice message for the called party 40. For purposes of this example, it is assumed that the calling party 10 indeed desires to leave a voice message for the called party 40. Accordingly, the calling party 10 provides a voice message 104 via the communication device 12 by speaking one or more utterances. In some cases, the calling party 10 may provide the voice message 104 after having indicated his/her intent to leave this voice message, for instance, by pressing on one or more buttons of the communication device 12 or speaking an utterance in response to the message 102.

When it receives the voice message 104, the caller-controlled messaging entity 32 records the voice message 104 and proceeds to generate an electronic message 106 representative of the voice message 104.

The electronic message 106 may take on different forms depending on the message destination information 31, 31' associated with the called party 40 that has been obtained by the caller-controlled messaging entity 32. For example: where the message destination information 31, 31' includes an email address associated with the called party 40, the electronic message 106 is an email message; where the message destination information 31, 31' includes a telephone number or other identifier identifying a communication device associated with the called party 40 and to which can be sent a text message or a multimedia message, the electronic message 106 is a text message or a multimedia message; and where the message destination information 31, 31' includes an IM identifier associated with the called party 40, the electronic message 106 is an IM message.

The caller-controlled messaging entity 32 can generate the electronic message 106 so that it is representative of the voice message 104 in different manners, depending on the message destination information 31, 31' associated with the called party 40 that has been obtained. For example, in some embodiments, the caller-controlled messaging entity 32 may generate an audio file (e.g., in waveform audio file format (WAV) or another audio file format) representative of the voice message 104 and include the audio file as part of the electronic message 106. This may be applicable where the electronic message 106 is an email message, a multimedia message, or an IM message. In other embodiments, the caller-controlled messaging entity 32 may apply a speech-to-text function on the voice message 104 to generate text representative of the voice message 104 and include the text as part of the electronic message 106. This may be applicable where the electronic message 106 is an email message, a text message, a multimedia message, or an IM message. In yet other embodiments, rather than including in the electronic message 106 the audio file representative of the voice message 104 or the text representative of the voice message 104, the caller-controlled messaging entity 32 may generate the electronic message 106 such that it conveys a link (e.g., a hyperlink) to a location (e.g., on a server) at which the audio file representative of the voice message 104 or the text representative of the voice message 104 can be accessed, whereby the link can be acted on (e.g., clicked on) by the electronic message's recipient in order to access the audio file representative of the voice message 104 or the text representative of the voice message 104.

Upon generating the electronic message 106, the caller-controlled messaging entity 32 proceeds to send the electronic message 106 based on the message destination information 31, 31' associated with the called party. More particularly, the caller-controlled messaging entity 32 sends the electronic message 106 to at least one destination specified by the message destination information 31, 31' via the network portion 42. The nature of the network portion 42 will depend on the nature of the electronic message 106. For example: where the electronic message 106 is an email message, the network portion 42 may comprise a data network portion; where the electronic message 106 is a text message or a multimedia message, the network portion 42 may comprise a wireless network portion; and where the electronic message 106 is an IM message, the network portion 42 may comprise a data network portion.

Once it is delivered to the at least one destination specified by the message destination information 31, 31' associated with the called party 40, the electronic message 106 may be presented to the called party 40 via a communication device used by the called party 40. In various situations, and depending on the nature of the electronic message 106, this communication device may be the communication device 16 or another communication device (e.g., a computer, a wireless phone, etc.) used by the called party 40. By being presented with the electronic message 106 that is representative of the voice message 104 left by the calling party 10, the called party 40 gains knowledge of the voice message 104, for example, by listening to an audio file included in the electronic message 106 and representative of the voice message 104, by reading text included in the electronic message 106 and representative of the voice message 104, or by acting on a link included in the electronic message 106 to access such an audio file or such text.

In cases where the electronic message 106 fails to be delivered to the at least one destination specified by the message destination information 31, 31' associated with the called party 40, for instance, due to the message destination information 31, 31' being invalid (e.g., an invalid email address or IM identifier), the caller-controlled messaging entity 32 may, upon receipt of a message delivery failure notification, proceed to notify the calling party 10 that the electronic message 106 could not be delivered. For example, the caller-controlled messaging entity 32 may send an electronic message (e.g., an email message, a text or multimedia message, or an IM message) or a voice message to a communication device (such as the communication device 12) associated with the calling party 10 in order to notify the calling party 10 that the electronic message 106 could not be delivered.

It will thus be appreciated that the caller-controlled messaging entity 32 enables the calling party 10 to leave a voice message for the called party 40 in a convenient and efficient way. In particular, the caller-controlled messaging entity 32 enables the calling party 10 to leave a voice message for the called party 40 without requiring that the called party 40 subscribe to a voicemail service. This may be particularly useful where the called party 40 does not subscribe to a voicemail service or where the called party 40 subscribes to a voicemail service that the calling party 10 does not wish to use.

It will also be appreciated that, as the caller-controlled messaging entity 32 is responsible for generating and sending the electronic message 106, the communication device 12 does not need to be specially configured (e.g., does not need to implement a special application) in order for the calling party 10 to avail himself/herself of the caller-controlled messaging service contemplated herein. Rather, standard functionality of the communication device 12 may be used in order to allow the calling party 10 to benefit from the caller-controlled messaging service contemplated herein.

While in the above-considered example the caller-controlled messaging service is used by the calling party 10 when the call for the called party 40 is deemed to have failed to be established, in this embodiment, the caller-controlled messaging service can be invoked by the calling party 10 at any moment after the calling party 10 calls the called party 40.

Figure 5:
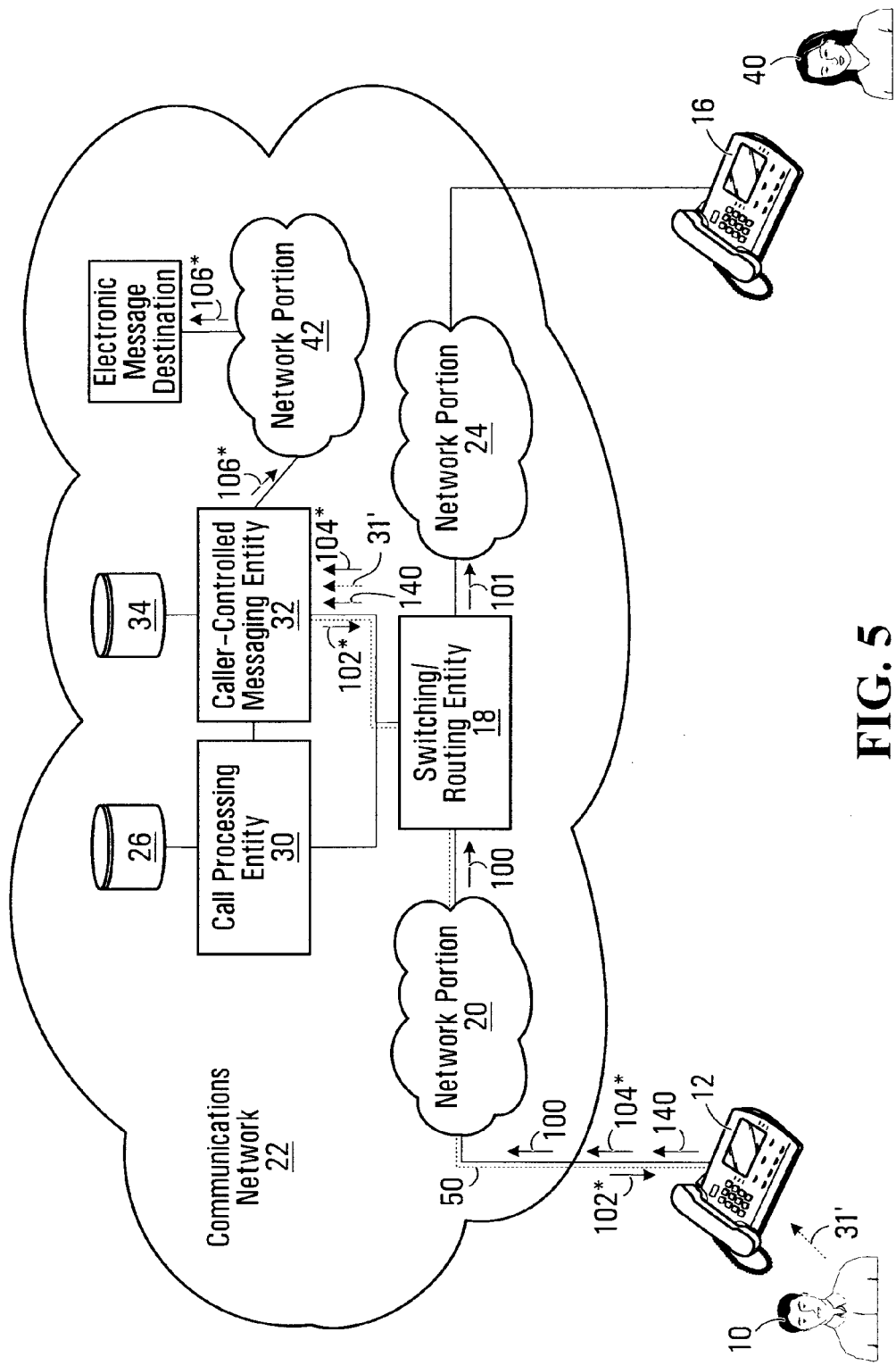
FIG. 5 shows another example of interaction between the user of the communication device and the network entity providing the caller-controlled messaging service, when the user uses the communication device to call a called party.

For instance, with reference to FIG. 5, operation of the caller-controlled messaging entity 32 will be illustrated in the context of another example that is based on the above-considered example where the calling party 10 uses the communication device 12 to call the called party 40 associated with the communication device 16. As described in the above-considered example, based on the signal 100 transmitted by the communication device 12, the call processing entity 30 determines that the calling party 10 subscribes to the caller-controlled messaging service, proceeds to invoke the caller-controlled messaging entity 32, and causes the switching/routing entity 18 to transmit the signal 101 over the network portion 24 so as to route the call to the communication device 16.

Meanwhile, the caller-controlled messaging entity 32 is attentive to receipt of a command indicative of a desire of the calling party 10 to leave a voice message for the called party 40. To that end, in some embodiments, the caller-controlled messaging entity 32 may maintain a communication path 50 with the communication device 12 over the network portion 20 to allow the calling party 10 to provide via the communication device 12 a command indicative of a desire to leave a voice message for the called party 40.

For purposes of this example, it is assumed that at a given moment after having called the called party 40, the calling party 10 desires to leave a voice message for the called party 40. At that moment, and with knowledge of availability of the caller-controlled messaging service contemplated herein, the calling party 10 provides a command 140 indicative of his/her desire to leave a voice message for the called party 40 by way of the caller-controlled messaging service. For instance, in one possible scenario, the calling party 10 may provide the command 140 before the call is answered at the communication device 16 or diverted to a called party voicemail system (if the called party 40 subscribes to a voicemail service). In another possible scenario, the calling party 10 may provide the command 140 after the call has been answered at the communication device 16 or diverted to a called party voicemail system (if the called party 40 subscribes to a voicemail service). In particular, the calling party 10 may provide the command 140 while the call establishes a communication path supporting voice communication between the communication device 12 and the communication device 16 (e.g., while the calling party 10 is engaged in a conversation with the called party 40). In yet another possible scenario, the calling party 10 may provide the command 140 when the call faces a busy signal indicative that the communication device 16 is in a busy state.

The command 140 indicative of a desire of the calling party 10 to leave a voice message for the called party 40 can take on many forms in various embodiments.

For example, in some embodiments, the command 140 may be a signal produced by the communication device 12 as a result of the calling party 10 pressing on one or more buttons of the communication device 12 (e.g., to enter a predetermined sequence of keys such as "*99", "##" or any other predetermined sequence of keys) or otherwise manually interacting with the communication device 12 in order to express a desire to leave a voice message for the called party 40. In these embodiments, the caller-controlled messaging entity 32 is adapted to detect the signal 140 when it is received and conclude that it is indicative of a desire of the calling party 10 to leave a voice message for the called party 40.

In other embodiments, the command 140 may be a voice command spoken by the calling party 10 while using the communication device 12. The voice command 140 is an utterance spoken by the calling party 10 and indicative of a desire of the calling party 10 to leave a voice message for the called party 40. For example, the voice command 140 may be "leave message", "send message" or some other utterance that is not expected to be used regularly during ordinary conversation in a vicinity of the communication device 12. In these embodiments, the caller-controlled messaging entity 32 implements a speech recognition function adapted to process the voice command 140 when it is received from the communication device 12 and conclude that it is indicative of a desire of the calling party 10 to leave a voice message for the called party 40. In some cases, the voice command 140 may be provided by the calling party 10 and received by the caller-controlled messaging entity 32 after the caller-controlled messaging entity 32 receives a "wake-up" signal produced by the communication device 12 as a result of the calling party 10 pressing on one or more buttons of the communication device 12 or otherwise manually interacting with the communication device 12, the wake-up signal serving to "wake up" the speech recognition function implemented by the caller-controlled messaging entity 32.

Upon receiving the command 140, the caller-controlled messaging entity 32 processes it. In embodiments where the command 140 is a voice command spoken by the calling party 10, the caller-controlled messaging entity 32 processes the voice command using the aforementioned speech recognition function. Based on its processing of the command 140, the caller-controlled messaging entity 32 determines that the calling party 10 desires to leave a voice message for the called party 40 and thus proceeds to perform a process with a view to allow the calling party 10 to leave such a voice message.

As part of this process, the caller-controlled messaging entity 32 consults at least one source of information in an attempt to obtain message destination information associated with the called party 40. More particularly, in this embodiment, the caller-controlled messaging entity 32 consults the database 34 in an attempt to find message destination information 31 associated with the called party 40. In this case, the caller-controlled messaging entity 32 consults the database 34 to identify a particular one of the records $210_1$-$210_N$ that is associated with the calling party 10. Upon identifying the particular one of the records $210_1$-$210_N$, the caller-controlled messaging entity 32 searches that record in an attempt to find an entry including a network identifier 29 identifying the communication device 16.

If the particular one of the records $210_1$-$210_N$ contains an entry including a network identifier 29 that identifies the communication device 16, the caller-controlled messaging entity 32 finds this entry and obtains therefrom the message destination information 31 associated with the called party 40. Thus, in this case, the attempt of the caller-controlled messaging entity 32 to obtain message destination information associated with the called party 40 is successful.

If the particular one of the records $210_1$-$210_N$ does not contain an entry including a network identifier 29 that identifies the communication device 16, the caller-controlled messaging entity 32 concludes that no message destination information associated with the called party 40 is available in that record. In this case, the attempt of the caller-controlled messaging entity 32 to obtain message destination information associated with the called party 40 is unsuccessful. The caller-controlled messaging entity 32 may inform the calling party 10 (e.g., by sending a message to the communication device 12) that he/she may not leave a voice message for the called party 40 in view of this lack of message destination information associated with the called party 40.

In some embodiments, when the attempt of the caller-controlled messaging entity 32 to obtain message destination information 31 associated with the called party 40 from the particular one of the records $210_1$-$210_N$ is unsuccessful, the caller-controlled messaging entity 32 may consult one or more other sources of information in an attempt to obtain message destination information associated with the called party 40.

For instance, in some embodiments, one source of information that the caller-controlled messaging entity 32 may consult is the calling party 10 himself/herself. In such embodiments, the caller-controlled messaging entity 32 may provide an opportunity for the calling party 10 to supply message destination information associated with the called party 40. For example, the caller-controlled messaging entity 32 may send a pre-recorded message to the communication device 12 inviting the calling party 10 to supply message destination information associated with the called party 40 via the communication device 12. The calling party 10 may then interact with the communication device 12 (e.g., by pressing on one or more buttons and/or speaking one or more utterances) to supply message destination information 31' associated with the called party 40. As another example, in some embodiments, the caller-controlled messaging entity 32 may have knowledge (e.g., based on information contained in the database 26 or the database 34) that the calling party 10 is associated with another communication device (e.g., a computer, a wireless phone, etc.) that may make it easier or more convenient for the calling party 10 to supply message destination information associated with the called party 40. In such embodiments, the caller-controlled messaging entity 32 may send a message to this other communication device to invite the calling party 10 to supply message destination information associated with the called party 40 via this other communication device. The calling party 10 may then interact with the other communication device to supply message destination information 31' associated with the called party 40 in response to the message sent by the caller-controlled messaging entity 32. In a situation where the calling party 10 does supply message destination information 31' associated with the called party 40, the attempt of the caller-controlled messaging entity 32 to obtain message destination information associated with the called party 40 is successful.

For purposes of this example, it is assumed that the caller-controlled messaging entity 32 obtains message destination information 31, 31' associated with the called party 40, either from the database 34 or the calling party 10. In response, the caller-controlled messaging entity 32 interacts with the calling party 10 to obtain a voice message for the called party 40.

More particularly, the caller-controlled messaging entity 32 provides an opportunity for the calling party 10 to leave a voice message for the called party 40. For example, in this embodiment, the caller-controlled messaging entity 32 sends a message 102* to the communication device 12, the message 102* inviting the calling party 10 to leave a voice message for the called party 40 (e.g., "Please leave your message after the tone"). The message 102* may be a voice message generated by the caller-controlled messaging entity 32. Alternatively, where the communication device 12 has a display screen, the message 102* may be a displayable message for display on the display screen of the communication device 12.

In addition, the caller-controlled messaging entity 32 may interact with the call processing entity 30 and/or the switching/routing entity 18 to cause termination or interruption of the call in order to allow the calling party 10 to leave a voice message for the called party 40. For example, in a scenario where the calling party 10 provided the command 140 before the call is answered at the communication device 16 or diverted to a called party voicemail system (if the called party 40 subscribes to a voicemail service) or when the call faces a busy signal, the caller-controlled messaging entity 32 may cause termination of the call to the communication device 16. In a scenario where the calling party 10 provided the command 140 after the call has been answered at the communication device 16 or diverted to a called party voicemail system (if the called party 40 subscribes to a voicemail service), the caller-controlled messaging entity 32 may cause termination or interruption of the call, which establishes a communication path supporting voice communication between the communication device 12 and the communication device 16 or which establishes a connection between the communication device 12 and the called party voicemail system, if applicable. Interruption of the call may be effected by temporarily disconnecting or muting a call leg to the communication device 16 or the called party voicemail system, if applicable, and reconnecting or un-muting the call leg at a subsequent time. The caller-controlled messaging entity 32 may cause reconnection or un-muting of the call leg upon determining that the calling party 10 is done providing a voice message for the called party 40 or upon determining that the calling party 10 will not be providing a voice message for the called party 40 (e.g., if the calling party 10 has not provided a voice message within a predetermined period of time).

Upon receiving the message 102*, the communication device 12 presents it to the calling party 10. Since in this example it was assumed that the calling party 10 desires to leave a voice message for the called party 40 and expressed this desire by providing the command 140, the calling party 10 proceeds to provide a voice message 104* via the communication device 12 by speaking one or more utterances.

When it receives the voice message 104*, the caller-controlled messaging entity 32 records the voice message 104* and proceeds to generate an electronic message 106* representative of the voice message 104*. The caller-controlled messaging entity 32 then sends the electronic message 106* via the network portion 42 to at least one destination specified by the message destination information 31, 31' associated with the called party 40. Generation and transmission of the electronic message 106* by the caller-controlled messaging entity 32 may be effected as described above in connection with generation and transmission of the electronic message 106.

It will thus be appreciated that, in this embodiment, the caller-controlled messaging entity 32 enables the calling party 10 to leave a voice message for the called party 40 at any moment after having called the called party 40. Hence, in this case, the caller-controlled messaging service implemented by the caller-controlled messaging entity 32 provides an "on-demand" messaging feature that the calling party 10 can invoke whenever he/she desires to leave a voice message for the called party 40 upon calling the called party 40.

While in embodiments considered above the caller-controlled messaging entity 32 can access the database 34 and/or interact with the calling party 10 in order to obtain the message destination information 31, 31' associated with the called party 40, in other embodiments, the caller-controlled messaging entity 32 may consult one or more other sources of information in an attempt to obtain message destination information associated with the called party 40.

For example, in some embodiments, the caller-controlled messaging entity 32 may consult a database (e.g., a corporate database, a directory database, etc.) containing a plurality of entries, where each entry includes a network identifier and message destination information associated with a potential called party (such as the called party 40) but (in contrast to the database 34) is not part of a record associated with a specific potential calling party (such as the calling party 10). In these embodiments, the network identifier in a given entry may be a telephone number identifying a telephone line to which a wired POTS phone is connected, an ESN and/or a telephone number associated with a wireless phone, or an IP address and/or a telephone number (and/or another URI such as a SIP URI) associated with a VoIP phone, ATA-equipped POTS phone, or softphone. For its part, the message destination information in the given entry may include one or more of: an email address associated with the potential called party; a telephone number or other identifier identifying a communication device associated with the potential called party and to which can be sent a text message or a multimedia message; and an IM identifier associated with the potential called party.

As another example, in some embodiments, the caller-controlled messaging entity 32 may access a public data network such as the Internet in an attempt to obtain message destination information associated with the called party 40.

More particularly, the caller-controlled messaging entity 32 may perform a search on one or more sites (e.g., web sites) of the public data network on a basis of information conveyed by the signal 100 and indicative that the call to which pertains the signal 100 is destined for the called party 40 (e.g., a destination telephone number identifying the communication device 16, a name or other identifier of the called party 40, etc.). For example, the caller-controlled messaging entity 32 may perform a search on one or more search engine sites (e.g., Google®, Yahoo!®) and/or one or more social networking sites (e.g., Facebook®, LinkedIn®). The caller-controlled messaging entity 32 may then process results of the search in an attempt to identify message destination information associated with the called party 40 (e.g., an email address, an IM identifier, and/or a telephone number or other identifier identifying a communication device to which can be sent a text message or a multimedia message).

Although in examples considered above the caller-controlled messaging entity 32 generates and causes transmission of a single electronic message 106, 106* to at least one destination specified by the message destination information 31, 31' associated with the called party 40, in other examples, the caller-controlled messaging entity 32 may generate and cause transmission of more than one electronic message representative of a voice message provided by the calling party 10. More particularly, in some cases, the caller-controlled messaging entity 32 may generate a plurality of electronic messages (such as the electronic message 106, 106*) representative of a voice message (such as the voice message 104, 104*) provided by the calling party 10 and cause transmission of these electronic messages to a plurality of destinations specified by the message destination information 31, 31' associated with the called party 40. For example, where the message destination information 31, 31' includes two or more of an email address, a wireless phone's telephone number (or other identifier), and an IM identifier associated with the called party 40, the plurality of electronic messages generated and caused to be sent by the caller-controlled messaging entity 40 may include two or more of an email message, a text or multimedia message, and an IM message intended for the called party 40. This allows the voice message provided by the calling party 10 to be effectively delivered to the called party 40 using plural communication channels, which can result in the called party 40 being more quickly apprised of this voice message. For example, in cases where multiple email addresses (e.g., personal and work email addresses) are available for the called party 40, the voice message provided by the calling party 10 may be delivered to the called party 40 via transmission of multiple email messages to these multiple email addresses. As another example, in cases where the communication device 16 is shared between the called party 40 and one or more other individuals (e.g., family members), the voice message provided by the calling party 10 may be delivered to the called party 40 via transmission of multiple electronic messages (e.g., each of which may be an email message, a text or multimedia message, or an IM message) to multiple destinations specified by the message destination information 31, 31' so as to be conveyed to the called party 40 and these one or more other individuals.

Also, in cases where the message destination information 31 associated with the called party 40 specifies two or more destinations to which can be sent an electronic message intended for the called party 40, the caller-controlled messaging entity 32 may generate and cause transmission to each of these destinations of a respective electronic message (such as the electronic message 106, 106*) representative of a voice message (such as the voice message 104, 104*) provided by the calling party 10. Alternatively, the caller-controlled messaging entity 32 may interact with the calling party 10 to allow him/her to select to which of these destinations an electronic message representative of his/her voice message is to be transmitted.

While in embodiments considered above the calling party 10 can leave a pure voice message (such as the voice message 104, 104*) for the called party 40, it will be appreciated that, in some embodiments, and depending on functionality of the communication device 12, the caller-controlled messaging entity 32 can allow the calling party 10 to leave a multimedia message, which includes a voice message, for the called party 40. For example, in embodiments where the communication device 12 has video capturing capability and where the message destination information 31, 31' specifies at least one destination to which a video message can be delivered, the caller-controlled messaging entity 32 may allow the calling party 10 to provide via the communication device 12 a video message, which includes a voice message, and may generate and transmit to such destination an electronic message (e.g., an email message, a multimedia message, or an IM message) representative of the video message (including the voice message) provided by the calling party 10.

Figure 6:
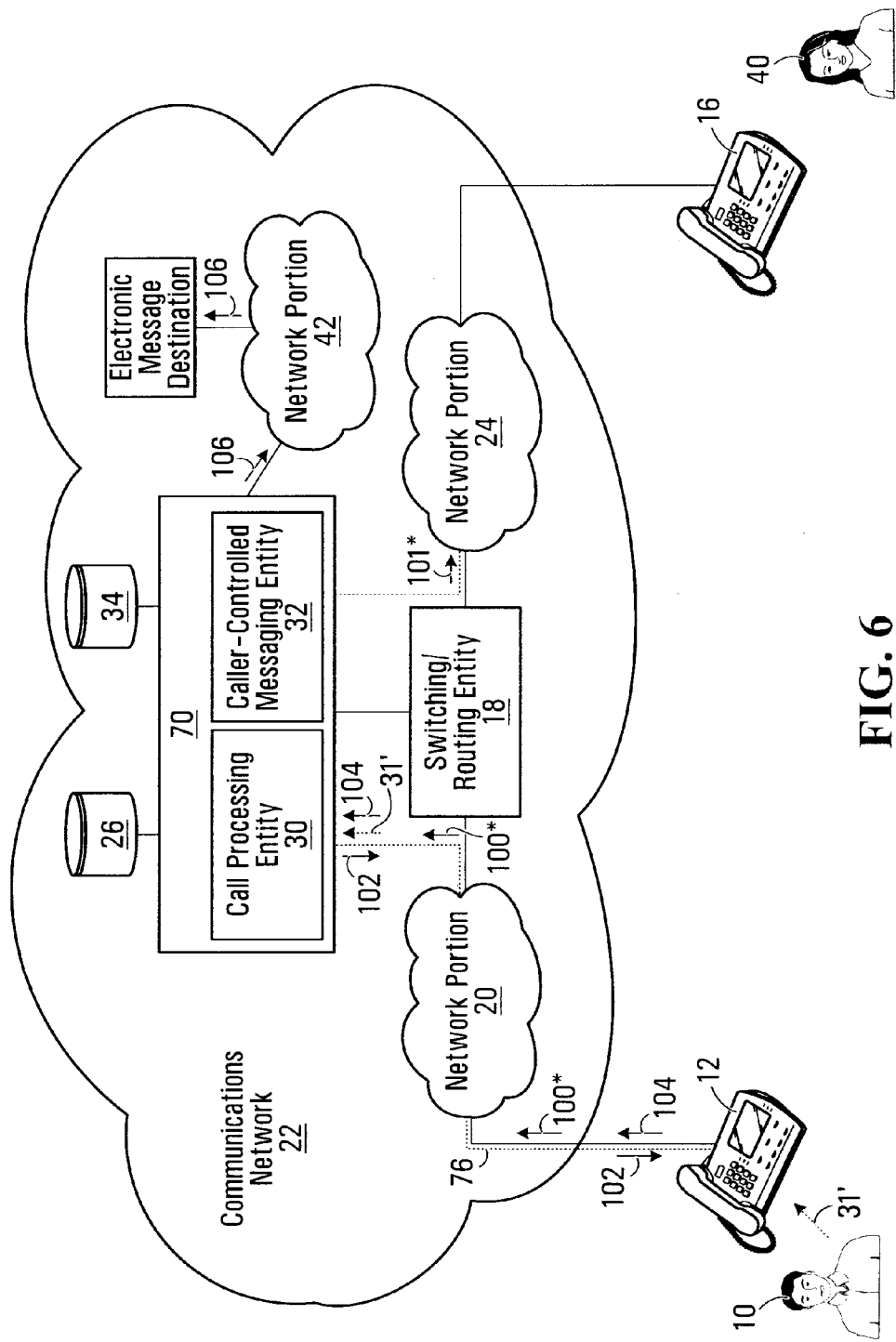
FIG. 6 shows an alternative embodiment in which the network entity providing the caller-controlled messaging service is implemented as part of an application server.

Although embodiments presented above illustrate one way in which the calling party 10 may call the called party 40, this can be effected in other ways in other embodiments. For example, FIG. 6 illustrates an embodiment in which the call processing entity 30 and the caller-controlled messaging entity 32 are implemented as part of an application server 70 that handles calls made using the communication device 12. While they are shown as distinct components in FIG. 6, in some embodiments, the application server 70 and the switching/routing entity 18 may be functional entities implemented by a common network element. For instance, in some embodiments, the application server 70 and the switching/routing entity 18 may be functional entities of a softswitch.

As in examples considered above, the user 10 uses the communication device 12 to call the called party 40 associated with the communication device 16. For instance, the user 10 may interact with the communication device 12 to dial a telephone number associated with the called party 40, select a contact identifier of the called party 40 from a contact function implemented by the communication device 12, or speak a voice command to call the called party 40. This interaction of the user 10 with the communication device 12 results in the communication device 12 transmitting a signal 100* over the network portion 20, the signal 100* pertaining to a call to be established between the communication device 12 and the communication device 16. For example, and depending on the nature of the network portion 20 and the nature of the interaction of the user 10 with the communication device 12, the signal 100* may convey one or more dual-tone multi-frequency (DTMF) tones, one or more data packets, or other information pertaining to a call to be established between the communication device 12 and the communication device 16.

In this embodiment, the signal 100* is transmitted to the application server 70 via a connection 76 between the communication device 12 and the application server 70 that is at least partly established over the network portion 20. Although not shown in FIG. 6, in some cases, the connection 76 may be established via the switching/routing entity 18 (for example, in embodiments where the switching/routing entity 18 resides in the PSTN or a wireless network).

The connection 76 may be established in various manners, depending on the nature of the communication device 12. For example, in embodiments where the communication device 12 is a wired POTS phone and the switching/routing entity 18 resides in the PSTN, the connection 76 may be established in response to detection of an off-hook condition of the communication device 12 by the switching/routing entity 18. In such embodiments, upon detecting the off-hook condition, the switching/routing entity 18 may proceed to notify the application server 70 (e.g., by auto-dialing a designated number associated with the application server 70) so as to cause establishment of the connection 76 between the application server 70 and the communication device 12. As another example, in embodiments where the communication device 12 is a wireless phone and the switching/routing entity 18 resides in a wireless network, the connection 76 may be established as a result of the user 10 inputting a particular command into the communication device 12 (e.g., by pressing a "send" or "talk" button or a dedicated button) before inputting information specifying a destination of the call (e.g., a telephone number). In such embodiments, upon detecting the particular command, the switching/routing entity 18 may proceed to notify the application server 70 (e.g., by auto-dialing a designated number associated with the application server 70) so as to cause establishment of the connection 76 between the application server 70 and the communication device 12. As yet another example, in embodiments where the communication device 12 is a VoIP phone, softphone or ATA-equipped POTS phone and the switching/routing entity 18 and the application server 70 are part of a softswitch residing in a data network, the connection 76 may be established in response to detection of an off-hook condition of the communication device 12 by the softswitch, which proceeds to cause establishment of the connection 76 between the application server 70 and the communication device 12.

With the connection 76 being established, the communication device 12 can communicate directly with the application server 70. This may be particularly useful in embodiments where the communication device 12 is a wired POTS phone or a wireless phone as the calling party 10 may benefit from one or more telephony services that may otherwise not be enabled by conventional PSTN or wireless network technology. For example, in embodiments where the application server 70 implements a speech recognition function, the calling party 10 may call the called party 40 by speaking a voice command indicative of a desire to call the called party 40 (e.g., "call Alice", "call 5555551234", etc.), whereby the voice command is relayed to the application server 70 via the connection 76 and processed by the application server's speech recognition function so as to attempt establishing a call between the communication device 12 and the communication device 16 associated with the called party 40.

More information regarding establishment of a connection such as the connection 76 between the communication device 12 and the application server 70 can be obtained from International PCT Application Serial No. PCT/CA2007/002346 entitled "A method and system for establishing a connection with a packet-based application server" filed on Dec. 21, 2007 in the Canadian Receiving Office by Jonathan Arsenault et al., and hereby incorporated herein by reference.

Thus, in this example, further to interaction of the user 10 with the communication device 12 to call the called party 40, the communication device 12 transmits the signal 100* to the application server 70 via the connection 76.

Upon reception of the signal 100* by the application server 70, the call processing entity 30 determines, based on information conveyed by the signal 100* (e.g., origination and destination telephone numbers), that the signal 100* pertains to a call to be established between the communication device 12 and the communication device 16. The call processing entity 30 proceeds to perform call processing operations in respect of the call to which pertains the signal 100* based on the aforementioned set of rules. For one or more of these rules, the call processing entity 30 may have to use call processing information 21 associated with the calling party 10. In particular, the call processing entity 30 may have to determine whether the calling party 10 subscribes to one or more telephony services and, if so, to perform one or more call processing operations in accordance with these one or more telephony services. To that end, the call processing entity 30 consults the database 26 to access a particular one of the records $200_1$-$200_M$ associated with the calling party 10 so as to determine whether the calling party 10 subscribes to one or more telephony services. For purposes of this example, it is assumed that the call processing entity 30 determines that the calling party 10 subscribes to the caller-controlled messaging service contemplated herein.

Having determined that the call to which pertains the signal 100* is destined for the communication device 16 associated with the called party 40, the call processing entity 30 causes transmission of a signal 101* over the network portion 24 so as to effect the call to the communication device 16, i.e., so as to initiate the call to the called party 40. In various embodiments, the call processing entity 30 may cause the switching/routing entity 18 to transmit the signal 101* or may itself transmit the signal 101*. For example, in embodiments where the switching/routing entity 18 resides in the PSTN or a wireless network, the call processing entity 30 may cause the switching/routing entity 18 to transmit the signal 101* or may itself transmit the signal 101* without involvement of the switching/routing entity 18. As another example, in embodiments where the switching/routing entity 18 and the application server 70 are part of a softswitch residing in a data network, the softswitch may transmit the signal 101* in direction of the communication device 16.

This example may then proceed as described above in connection with FIGS. 4 and 5, where the caller-controlled messaging entity 32 enables the calling party 10 to leave a voice message (such as the voice message 104, 104*) for the called party 40, generates an electronic message (such as the electronic message 106, 106*) representative of the voice message, and causes transmission of the electronic message based on message destination information 31, 31' associated with the called party 40.

As mentioned earlier, with the caller-controlled messaging entity 32 being responsible for generating and sending the electronic message 106, 106*, the communication device 12 does not need to be specially configured (e.g., does not need to implement a special application) in order for the calling party 10 to avail himself/herself of the caller-controlled messaging service contemplated herein. However, in some embodiments, some functionality of the caller-controlled messaging entity 32 can be implemented by the communication device 12, in particular, functionality enabling the above-described "on-demand" messaging feature that can be invoked by the calling party 10 at any moment after he/she calls the called party 40, in order to leave a voice message for the called party 40.

More particularly, in these embodiments, the communication device 12 comprises suitable hardware, firmware, software, control logic, or a combination thereof for implementing a plurality of functional components, including an interface for sending and receiving signals over the communications network 22 and a processing unit for effecting various processing operations, including processing operations enabling an "on-demand" messaging feature that can be invoked by the calling party 10 at any moment after he/she calls the called party 40, in order to leave a voice message for the called party 40. More particularly, in these embodiments, the processing unit of the communication device 12 is operative to determine that the calling party 10 originated a call for the called party 40 using the communication device 12. The processing unit of the communication device 12 is attentive to receipt of a command provided by the calling party 10 and indicative of his/her desire to leave a voice message for the called party 40. In response to receiving such a command (which may be a signal resulting from the calling party 10 manually interacting with the communication device 12 and/ or a voice command spoken by the calling party 10), the processing unit of the communication device 12 proceeds to consult at least one source of information in an attempt to obtain message destination information associated with the called party 40. For example, in some cases, the processing unit of the communication device 12 may consult a memory of the communication device 12 that stores message destination information associated with various potential called parties or may consult one or more other sources of information. Alternatively, the processing unit of the communication device 12 may prompt the calling party 10 to supply message destination information associated with the called party 40. Upon obtaining message destination information associated with the called party 40 and receiving a voice message provided by the calling party 10, the processing unit of the communication device 12 can generate an electronic message (e.g., an email message, a text message, a multimedia message, or an IM message) representative of the voice message provided by the calling party 10 and proceed to send the electronic message based on the message destination information over the communications network 22.

Those skilled in the art will appreciate that, in some embodiments, certain functionality of a given component described herein (including the caller-controlled messaging entity 32) may be implemented as pre-programmed hardware or firmware elements (e.g., application specific integrated circuits (ASICs), electrically erasable programmable read-only memories (EEPROMs), etc.) or other related elements. In other embodiments, a given component described herein (including the caller-controlled messaging entity 32) may comprise a processor having access to a code memory which stores program instructions for operation of the processor to implement functionality of that given component. The program instructions may be stored on a medium that is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A network apparatus for allowing a calling party to leave a message for a called party, the calling party using a communication device to call the called party, said network apparatus comprising:

an interface for communicating with the communication device via a communications network; and a processing unit coupled to said interface and operative for:

determining that the calling party is attempting to establish a telephone call with the called party;

determining whether the calling party subscribes to a messaging service;

consulting at least one source of information to obtain message destination information associated with the called party's telephone number;

upon determining that the calling party subscribes to the messaging service, providing an opportunity for the calling party to leave a voice message for the called party via the communication device;

generating an electronic message representative of the voice message provided by the calling party; and causing transmission of the electronic message based on the message destination information.

2. A network apparatus as claimed in claim 1, wherein the at least one source of information includes a database containing a plurality of entries, each entry being associated with a potential called party and including message destination information associated with the potential called party.

3. A network apparatus as claimed in claim 1, wherein the at least one source of information includes a database containing a plurality of records, said consulting comprising accessing a particular one of the records that is associated with the calling party.

4. A network apparatus as claimed in claim 3, wherein the particular one of the records includes an address book associated with the calling party.

5. A network apparatus as claimed in claim 1, wherein the at least one source of information includes the calling party, said consulting comprising sending a message inviting the calling party to supply message destination information associated with the called party.

6. A network apparatus as claimed in claim 1, wherein the at least one source of information includes a public data network, said consulting comprising performing a search on at least one site of the public data network.

7. A network apparatus as claimed in claim 6, wherein the at least one site of the public data network includes a search engine site or a social networking site.

8. A network apparatus as claimed in claim 1, wherein said providing comprises sending a message to the communication device, the message inviting the calling party to leave a voice message for the called party.

9. A network apparatus as claimed in claim 1, wherein said generating comprises:

generating an audio file representative of the voice message provided by the calling party; and including the audio file in the electronic message.

10. A network apparatus as claimed in claim 1, wherein said generating comprises:

applying a speech-to-text function on the voice message provided by the calling party to generate text representative of the voice message provided by the calling party; and including the text in the electronic message.

11. A network apparatus as claimed in claim 1, wherein said generating comprises:

generating an audio file representative of the voice message provided by the calling party; and including in the electronic message a link to access the audio file.

12. A network apparatus as claimed in claim 1, wherein said generating comprises:
    generating text representative of the voice message provided by the calling party; and
    including in the electronic message a link to access the text.

13. A network apparatus as claimed in claim 1, wherein the message destination information includes an email address associated with the called party and the electronic message is an email message.

14. A network apparatus as claimed in claim 1, wherein the message destination information includes an instant messaging identifier associated with the called party and the electronic message is an instant messaging message.

15. A network apparatus as claimed in claim 1, wherein the message destination information includes an identifier of a wireless communication device associated with the called party and the electronic message is a text message or a multimedia message.

16. A network apparatus as claimed in claim 1, wherein the communication device is a first communication device, said processing unit being operative for initiating the telephone call to be established between the first communication device and a second communication device associated with the called party.

17. A network apparatus as claimed in claim 1, wherein the telephone call is one of a voice call, a video call and a multimedia call.

18. A method for execution by a network entity to allow a calling party to leave a message for a called party, the calling party using a communication device to call the called party, the network entity being connected to the communication device via a communications network, said method comprising:
    determining that the calling party is attempting to establish a telephone call with the called party;
    determining whether the calling party subscribes to a messaging service;
    consulting at least one source of information to obtain message destination information associated with the called party's telephone number;
    upon determining that the calling party subscribes to the messaging service, providing an opportunity for the calling party to leave a voice message for the called party via the communication device;
    generating an electronic message representative of the voice message provided by the calling party; and
    causing transmission of the electronic message based on the message destination information.

19. A method as claimed in claim 18, wherein the at least one source of information includes a database containing a plurality of entries, each entry being associated with a potential called party and including message destination information associated with the potential called party.

20. A method as claimed in claim 18, wherein the at least one source of information includes a database containing a plurality of records, said consulting comprising accessing a particular one of the records that is associated with the calling party.

21. A method as claimed in claim 20, wherein the particular one of the records includes an address book associated with the calling party.

22. A method as claimed in claim 18, wherein the at least one source of information includes the calling party, said consulting comprising sending a message inviting the calling party to supply message destination information associated with the called party.

23. A method as claimed in claim 18, wherein the at least one source of information includes a public data network, said consulting comprising performing a search on at least one site of the public data network.

24. A method as claimed in claim 23, wherein the at least one site of the public data network includes a search engine site or a social networking site.

25. A method as claimed in claim 18, wherein said providing comprises sending a message to the communication device, the message inviting the calling party to leave a voice message for the called party.

26. A method as claimed in claim 18, wherein said generating comprises:
    generating an audio file representative of the voice message provided by the calling party; and
    including the audio file in the electronic message.

27. A method as claimed in claim 18, wherein said generating comprises:
    applying a speech-to-text function on the voice message provided by the calling party to generate text representative of the voice message provided by the calling party; and
    including the text in the electronic message.

28. A method as claimed in claim 18, wherein said generating comprises;
    generating an audio file representative of the voice message provided by the calling party; and
    including in the electronic message a link to access the audio file.

29. A method as claimed in claim 18, wherein said generating comprises:
    generating text representative of the voice message provided by the calling party; and
    including in the electronic message a link to access the text.

30. A method as claimed in claim 18, wherein the message destination information includes an email address associated with the called party and the electronic message is an email message.

31. A method as claimed in claim 18, wherein the message destination information includes an instant messaging identifier associated with the called party and the electronic message is an instant messaging message.

32. A method as claimed in claim 18, wherein the message destination information includes an identifier of a wireless communication device associated with the called party and the electronic message is a text message or a multimedia message.

33. A method as claimed in claim 18, wherein the communication device is a first communication device, said method comprising initiating the telephone call to be established between the first communication device and a second communication device associated with the called party.

34. A method as claimed in claim 18, wherein the telephone call is one of a voice call, a video call and a multimedia call.

35. Non-transitory computer-readable media storing a program element for execution by a computer system to allow a calling party to leave a message for a called party, the calling party using a communication device to call the called party, the computer system being connected to the communication device via a communications network, said program element comprising:
    first program code for causing the computer system to determine that the calling party is attempting to establish a telephone call with the called party;
    second program code for causing the computer system to determine whether the calling party subscribes to a messaging service;

third program code for causing the computer system to consult at least one source of information to obtain message destination information associated with the called party's telephone number;

fourth program code for causing the computer system to provide an opportunity for the calling party to leave a voice message for the called party via the communication device, upon the computer system determining that the calling party subscribes to the messaging service;

program code for causing the computer system to generate an electronic message representative of the voice message provided by the calling party; and sixth program code for causing the computer system to cause transmission of the electronic message based on the message destination information.

* * * * *